US010180560B2

(12) United States Patent
Takehana et al.

(10) Patent No.: US 10,180,560 B2
(45) Date of Patent: Jan. 15, 2019

(54) OPTICAL PROJECTION DEVICE AND PROJECTOR THAT CORRECTS THE INCLINATION OF THE MOVABLE LENS FRAME WITH RESPECT TO THE OPTICAL AXIS

(71) Applicant: SEIKO EPSON CORPORATION, Tokyo (JP)

(72) Inventors: Naoto Takehana, Matsumoto (JP); Takuya Hatano, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/543,186

(22) PCT Filed: Jan. 8, 2016

(86) PCT No.: PCT/JP2016/000085
§ 371 (c)(1),
(2) Date: Jul. 12, 2017

(87) PCT Pub. No.: WO2016/121302
PCT Pub. Date: Aug. 4, 2016

(65) Prior Publication Data
US 2018/0017758 A1    Jan. 18, 2018

(30) Foreign Application Priority Data

Jan. 27, 2015 (JP) ................. 2015-013025
Jan. 27, 2015 (JP) ................. 2015-013026
Mar. 27, 2015 (JP) ................. 2015-065939

(51) Int. Cl.
G02B 7/04      (2006.01)
G02B 7/105     (2006.01)
(Continued)

(52) U.S. Cl.
CPC ............... *G02B 7/04* (2013.01); *G02B 7/021* (2013.01); *G02B 7/09* (2013.01); *G02B 7/10* (2013.01);
(Continued)

(58) Field of Classification Search
CPC .......... G02B 7/021; G02B 7/023; G02B 7/04; G02B 7/09; G02B 7/10; G02B 7/102; G02B 7/105; G03B 21/142; G03B 21/28
See application file for complete search history.

(56) References Cited

U.S. PATENT DOCUMENTS

| 7,744,295 | B2 * | 6/2010 | Yoshibe | G03B 9/02 |
| | | | | 396/509 |
| 8,641,208 | B2 * | 2/2014 | Amano | G02B 7/021 |
| | | | | 353/102 |
| 9,188,844 | B2 * | 11/2015 | Shen | G02B 7/021 |
| 9,448,464 | B2 * | 9/2016 | Lin | G02B 21/28 |
| 9,690,176 | B2 * | 6/2017 | Takehana | G03B 21/147 |
| 2004/0190160 | A1 * | 9/2004 | Nishimura | G02B 7/021 |
| | | | | 359/699 |

(Continued)

FOREIGN PATENT DOCUMENTS

JP   S59-061804 A    4/1984
JP   2001-305408 A   10/2001
(Continued)

OTHER PUBLICATIONS

Apr. 5, 2016 International Search Report issued in International Patent Application No. PCT/JP2016/000085.

*Primary Examiner* — Bao-Luan Le
(74) *Attorney, Agent, or Firm* — Oliff PLC

(57) ABSTRACT

A optical projection device that projects an image with excellent image quality while achieving miniaturization is provided. The optical projection device includes a first lens frame holding a first lens group L1 and including a cam pin,
(Continued)

a guide barrel including a straight movement groove, a cam barrel including a cam groove, and an urging portion that urges the first lens frame in a direction intersecting with the direction along an optical axis. The cam pin is formed at a position spaced apart from a center of gravity including the first lens frame and members attached to the first lens frame in the direction along the optical axis Ax and the urging portion urges the first lens frame at a position closer than the cam pin with respect to the center of gravity in the direction along the optical axis.

17 Claims, 13 Drawing Sheets

(51) Int. Cl.
  *G02B 7/09* (2006.01)
  *G02B 7/02* (2006.01)
  *G02B 7/10* (2006.01)
  *G03B 21/14* (2006.01)
  *G03B 21/28* (2006.01)
  *G02B 27/14* (2006.01)

(52) U.S. Cl.
  CPC ........... *G02B 7/105* (2013.01); *G03B 21/142* (2013.01); *G03B 21/147* (2013.01); *G03B 21/28* (2013.01); *G02B 7/102* (2013.01); *G02B 27/149* (2013.01)

(56) References Cited

U.S. PATENT DOCUMENTS

| | | | |
|---|---|---|---|
| 2006/0072218 A1 | 4/2006 | Kageyama et al. | |
| 2008/0260376 A1* | 10/2008 | Yoshibe | G02B 7/10 396/505 |
| 2011/0026137 A1 | 2/2011 | Kato | |
| 2011/0292355 A1* | 12/2011 | Amano | G02B 7/021 353/98 |
| 2013/0342818 A1* | 12/2013 | Shen | G02B 7/021 353/100 |
| 2016/0116830 A1* | 4/2016 | Lin | G02B 21/28 353/97 |
| 2016/0216598 A1* | 7/2016 | Takehana | G03B 21/147 |

FOREIGN PATENT DOCUMENTS

| | | |
|---|---|---|
| JP | 2004-29619 A | 1/2004 |
| JP | 2006-098932 A | 4/2006 |
| JP | 2009-145368 A | 7/2009 |
| JP | 2010-107703 A | 5/2010 |
| JP | 2010-169915 A | 8/2010 |
| JP | 2011-28093 A | 2/2011 |
| JP | 2011-085922 A | 4/2011 |

* cited by examiner

OPTICAL PROJECTION DEVICE AND PROJECTOR THAT CORRECTS THE INCLINATION OF THE MOVABLE LENS FRAME WITH RESPECT TO THE OPTICAL AXIS

TECHNICAL FIELD

The present invention relates to a optical projection device and a projector.

BACKGROUND ART

In the related art, a projector including a light source, an optical modulation device which modulates light emitted from the light source according to image information, and a optical projection device which projects light modulated by the optical modulation device is known. The optical projection device is configured to include the plurality of lens groups. A projection lens (optical projection device) including a lens group configured to be able to move along an optical axis among a plurality of lens groups is suggested (for example, see PTL 1).

The projection lens described in PTL 1 includes a guide barrel having a straight movement groove, a cam barrel having a cam groove, a first lens group to a seventh lens group, and a plurality of lens frames. Among the plurality of lens frames, there is a front lens frame holding a fourth lens group, an intermediate lens frame holding a fifth lens group, and a rear lens frame holding a sixth lens group. The intermediate lens frame is disposed between the front lens frame and the rear lens frame and the rear lens frame is fixed to the front lens frame.

Each of the front lens frame and the intermediate lens frame has cam pins engaging with the cam groove and the cam pins are supported on the cam groove and disposed thereon. The cam pins which sandwich the intermediate lens frame therebetween are formed on one side of the front lens frame in a direction along the optical axis, the front lens frame holds the fourth lens group in the vicinity of the cam pins, and the rear lens frame is fixed to the other side of front lens frame.

When the cam barrel is rotated, the cam pins are guided to a straight movement groove and the cam groove and thus, the front lens frame and the intermediate lens frame are moved independently of each other. Since the rear lens frame is fixed to the front lens frame, the front lens frame and the rear lens frame are integrally moved in a state of respectively holding the fourth lens group and the sixth lens group.

CITATION LIST

Patent Literature

PTL 1: JP-A-2010-107703

SUMMARY OF INVENTION

Technical Problem

However, there is a possibility that the front lens frame and the rear lens frame are inclined with respect to an optical axis of the projection lens described in PTL 1. That is, it is considered that the cam pins of the front lens frame are supported on the cam groove and disposed thereon and the center of gravity of members of the front lens frame, the fourth lens group, the rear lens frame, and the sixth lens group that are integrally moved is close to the rear lens frame than the cam pins in the direction along the optical axis. It is considered that since the cam pins and the rear lens frame are disposed to be spaced apart by an amount exceeding a movement amount of the intermediate lens frame in the direction along the optical axis, the position of the cam pin and the position of the center of gravity are greatly displaced in the direction along the optical axis. For that reason, there is a possibility that the front lens frame and the rear lens frame are inclined so that the rear lens frame side is lowered.

When the front lens frame and the rear lens frame are inclined, the fourth lens group and the sixth lens group are also inclined with respect to the optical axis and thus, a projected image is distorted. In a case where weight of the sixth lens group is larger than weight of the fourth lens group, the position of the cam pin and the position of the center of gravity are further spaced apart from each other and thus, a problem to be solved that the inclination becomes more remarkable and smooth movement of the front lens frame and the rear lens frame becomes difficult occurs.

Solution to Problem

The present invention is intended to solve at least some of the problems described above and may be realized by the following aspects or application examples.

Application Example 1

A optical projection device according to the present application example is a optical projection device having a movable lens group movable along an optical axis, and the optical projection device includes a movable lens frame including a holding portion which holds the movable lens group and a cam pin which protrudes from the holding portion, a guide barrel which includes a straight movement groove extending in the same direction as the direction along the optical axis and in which the cam pin is inserted into the straight movement groove, a cam barrel which includes a cam groove into which the guide barrel is fitted and with which the cam pin protruding from the straight movement groove is engaged and which is rotated with respect to the guide barrel to thereby guide the cam pin by the straight movement groove and the cam groove and move the movable lens frame along the optical axis, and a correction portion which corrects an inclination of the movable lens frame with respect to the optical axis.

According to this configuration, since the cam pin is engaged with the cam groove of the cam barrel and supported thereon, when the cam pin is formed at a position spaced apart from the center of gravity, the movable lens frame holding the movable lens group becomes easy to incline with respect to the optical axis according to an amount spaced therefrom, but the optical projection device includes the correction portion and thus, it is possible to suppress the inclination. Accordingly, it is possible to suppress the inclination of the movable lens group held in the movable lens frame while increasing freedom of arrangement of the cam pin or achieving miniaturization of the cam barrel in the direction along the optical axis. Accordingly, it becomes possible to provide a optical projection device which suppresses distortion of an image and to project an image with excellent image quality while achieving suppression of complication, miniaturization, light weighting of a structure or configuring member. Since the inclination is suppressed, smooth movement becomes possible in the movable lens frame, it is possible to make an operating force small in a configuration in which the cam barrel is manually rotated, and it becomes possible to realize less power consumption in a configuration in which the cam barrel is electrically rotated.

Application Example 2

In the optical projection device according to the application example described above, it is preferable that the cam pin is formed at a position spaced apart from the center of gravity including the movable lens frame and members attached to the movable lens frame in the direction along the optical axis, the correction portion is an urging portion which urges the movable lens frame in a direction intersecting with the direction along the optical axis, the optical projection device includes a receiving portion which receives the movable lens frame urged by the urging portion, and the urging portion urges the movable lens frame at a position closer than the cam pin with respect to the center of gravity in the direction along the optical axis.

According to this configuration, since the optical projection device includes the urging portion as the correction portion and the receiving portion, it becomes possible to suppress the inclination of the movable lens group.

Application Example 3

In the optical projection device according to the application example described above, it is preferable that the urging portion urges a portion located in the vicinity of the center of gravity in the direction along the optical axis.

According to this configuration, it becomes possible to form an urging portion which efficiently transmits an urging force for suppressing the inclination of the movable lens frame to the movable lens frame. Accordingly, it becomes possible to miniaturize the urging portion and simplify a shape of the urging portion. Since it is possible to make the urging force small, it becomes possible for the optical projection device to be easily assembled even in the configuration in which the urging portion is included.

Application Example 4

In the optical projection device according to the application example described above, it is preferable that the movable lens frame protrudes from the cam barrel to the light emission side and includes a frame protruding portion holding the movable lens group, and the urging portion urges the frame protruding portion.

According to this configuration, it is possible to make a size of the cam barrel in the direction along the optical axis small and it becomes possible to suppress the inclination of the movable lens frame with respect to the optical axis even in a configuration in which the center of gravity resides outside of the cam barrel in the direction along the optical axis.

Application Example 5

In the optical projection device according to the application example described above, it is preferable that the optical projection device includes a plurality of the movable lens groups and a plurality of the movable lens frames which respectively hold the plurality of the movable lens groups, each of the cam pins is formed at a position spaced apart in the same direction with respect to each center of gravity including the movable lens frame and members attached to the movable lens frame in the direction along the optical axis in the plurality of the movable lens frame, and the urging portion urges the movable lens frame holding the movable lens group disposed closest to an end of a side opposite to the same direction in the direction along the optical axis, among the plurality of movable lens groups.

According to this configuration, for example, the cam pin of each of the plurality of the movable lens frames is formed at a light incidence side of the movable lens frame and the urging portion urges the movable lens frame holding the movable lens group disposed closest to a light emission side among the plurality of movable lens groups. With this, even in the configuration in which the plurality of the movable lens groups are included, it becomes possible to miniaturize the cam barrel in the direction along the optical axis, suppress complication of a structure, and suppress the inclination of the movable lens frame disposed closest to the light emission side or closest to the light incidence side with respect to the optical axis.

Application Example 6

In the optical projection device according to the application example described above, it is preferable that the urging portion includes a first urging portion and a second urging portion that urge the movable lens frame in each direction of a first direction and a second direction that intersect with each other within a plane orthogonal to the optical axis.

According to this configuration, since it is possible to suppress the inclination of the movable lens group in the two directions described above, it becomes further possible to provide the optical projection device projecting an image with excellent image quality.

Application Example 7

In the optical projection device according to the application example described above, it is preferable that the receiving portion is provided in the guide barrel and slidably receives the movable lens frame urged by the urging portion.

According to this configuration, it becomes possible to provide a configuration in which the inclination of the movable lens frame is accurately suppressed with a simple structure.

Application Example 8

In the optical projection device according to the application example described above, it is preferable that the urging portion is a leaf spring supported on the guide barrel or the movable lens frame.

According to this configuration, for example, it becomes possible to provide a configuration in which the movable lens frame is easily urged by forming the urging portion in such a way that one end side is fixed to the guide barrel and the movable lens frame is pushed at the other end side. Also, it becomes possible to provide a configuration in which the movable lens frame is urged by a reaction force pushing the guide barrel by forming the urging portion in such a way that one end side is fixed to the movable lens frame and the guide barrel is pushed at the other end side. Accordingly, it becomes possible to provide a configuration in which the movable lens frame is urged in a simple structure while achieving space-saving of disposition space of the urging portion in a simple structure.

Application Example 9

In the optical projection device according to the application example described above, it is preferable that the optical projection device includes a plurality of the movable lens groups sequentially disposed toward the other side from one side of the optical axis and a plurality of the movable lens frames respectively holding the plurality of the movable lens groups, at least one movable lens frame of the plurality of the movable lens frames is a protrusion lens frame including an insertion portion inserted into the movable lens frame adjacent to the one side and a frame fitting portion fitted into the guide barrel, and the correction portion is a slide protrusion which protrudes from at least any one of the inner surface of the guide barrel and the outer surface of the frame fitting portion and by which the protrusion lens frame is slidably abutted on the guide barrel.

According to this configuration, in the protrusion lens frame among the plurality of the movable lens frames, the insertion portion is inserted into the movable lens frame adjacent to the one side and the frame fitting portion is fitted into the guide barrel. Since the protrusion lens frame slides by being abutted on the guide barrel by the slide protrusion, even when the cam pin is provided at a position spaced apart from the center of gravity including the protrusion lens frame and the movable lens group held by the protrusion lens frame, the inclination with respect to the optical axis is suppressed. Accordingly, it becomes possible to provide the optical projection device capable of suppressing the inclination of the movable lens group held by the protrusion lens frame with space saving and a simple configuration.

Application Example 10

In the optical projection device according to the application example described above, it is preferable that the plurality of the movable lens groups include a top lens group disposed closest to the one side among the plurality of movable lens groups and a plurality of rear-stage lens groups sequentially disposed at the other side of the top lens group, and the plurality of the movable lens frames respectively holding the plurality of the rear-stage lens groups are the protrusion lens frame.

According to this configuration, since the movable lens frames respectively holding the plurality of the rear-stage lens groups are the protrusion lens frame, the inclination with respect to the optical axis is suppressed by the slide protrusion and is moved. With this, it becomes possible to suppress the inclination of the plurality of the rear-stage lens groups with respect to the optical axis with a simple configuration.

Application Example 11

In the optical projection device according to the application example described above, it is preferable that the optical projection device includes the protrusion lens frame having the slide protrusion and a notch allowing the slide protrusion to pass is formed in the movable lens frame into which the insertion portion of the protrusion lens frame having the slide protrusion is inserted.

According to this configuration, the notch allowing the slide protrusion to pass is formed in the movable lens frame into which the insertion portion of the protrusion lens frame having the slide protrusion is inserted. With this, it becomes possible to form the slide protrusion at a position closer than the cam pin with respect to the insertion portion in the protrusion lens frame. Accordingly, in a case where it is configured in such a way that the movable lens group is disposed in the insertion portion, it is considered that the center of gravity including the protrusion lens frame and the movable lens group held by the protrusion lens frame is in the vicinity of the movable lens group and thus, it becomes possible to provide the slide protrusion at the position closer than the cam pin with respect to the movable lens group and efficiently suppress the inclination of the protrusion lens frame with respect to the optical axis.

Application Example 12

In the optical projection device according to the application example described above, it is preferable that the optical projection device includes the protrusion lens frame in which the slide protrusions are arranged at both sides between which the cam pin is sandwiched, in the direction along the optical axis.

According to this configuration, both sides of the cam pin supported on the cam groove are slidably abutted on the guide barrel in the protrusion lens frame. A plurality of points in the protrusion lens frame are slidably abutted on the guide barrel in the direction along the optical axis. With this, it becomes possible to further suppress the inclination of the protrusion lens frame with respect to the optical axis.

Application Example 13

In the optical projection device according to the application example described above, it is preferable that the slide protrusions are formed intermittently in a circumferential direction around the optical axis.

According to this configuration, simplification of a mold structure for forming the slide protrusion or mold processing for finely adjusting the size of the slide protrusion becomes easier compared to a configuration in which the slide protrusion is formed throughout the entire circumference around the optical axis.

Application Example 14

In the optical projection device according to the application example described above, it is preferable that the optical projection device includes an adjacently-provided lens group adjacent to the movable lens group and an adjacently-provided holding frame that holds the adjacently-provided lens group, one of any of the movable lens frame and the adjacently-provided holding frame includes an insertion portion to be inserted into the other of the movable lens frame and the adjacently-provided holding frame and the other includes an inserted portion into which the insertion portion is inserted, the correction portion is an elastic member pushed between the outer peripheral surface of the insertion portion and the inner peripheral surface of the inserted portion, and the elastic member is disposed at one of any of the outer peripheral surface and the inner peripheral surface and is formed to be relatively slidable with respect to the other of the outer peripheral surface and the inner peripheral surface.

According to this configuration, the optical projection device includes the movable lens frame and the adjacently-provided holding frame which are adjacent to each other and is formed in such a way that the insertion portion provided at the one of the movable lens frame and the adjacently-provided holding frame is inserted into the inserted portion provided at the other thereof. The elastic member described above is disposed between the outer peripheral surface of the insertion portion and the inner peripheral surface of the inserted portion. With this, even in the configuration of the movable lens frame in which positions of the cam pin and the movable lens group are spaced apart, it is possible to keep a distance between the outer peripheral surface of the insertion portion and the inner peripheral surface of the inserted portion at a predetermined distance by the elastic member. Accordingly, it is possible to prevent the mutual inclination between the movable lens frame and the adjacently-provided holding frame with respect to the optical axis.

Application Example 15

In the optical projection device according to the application example described above, it is preferable that the movable lens frame and the adjacently-provided holding frame are moved along the optical axis independently of each other.

According to this configuration, since the movable lens group and the adjacently-provided lens group that are adjacent to each other are configured as lens groups contributing to adjustment such as focus adjustment and zoom adjustment, it becomes possible to provide the optical projection device projecting an image with excellent image quality even in a case where the adjustment described above is performed.

Application Example 16

In the optical projection device according to the application example described above, it is preferable that a groove portion extending in the peripheral direction is formed on the outer peripheral surface of the insertion portion and the elastic member is installed at the groove portion formed in a ring shape.

According to this configuration, it is possible to dispose the elastic member in the insertion portion with a simple structure.

Application Example 17

In the optical projection device according to the application example described above, it is preferable that the optical projection device includes a reflection optical system reflecting light emitted from the movable lens group.

According to this configuration, it becomes possible to change the direction of light from the movable lens group and achieve widening of an angle of light by the reflection optical system. Accordingly, it is possible to provide the optical projection device disposed close to a projection surface and capable of widening an angle.

Application Example 18

In the projection optical projection device according to the application example described above, it is preferable that the movable lens group is a lens group contributing to the focus adjustment.

According to this configuration, since the inclination of the movable lens group, which contributes to the focus adjustment, with respect to the optical axis is suppressed, it becomes possible to provide the optical projection device suppressing the increase in optical aberration and projecting an image with excellent image quality, even in a case where the focus adjustment is performed.

Application Example 19

A projector according to the present application example includes a light source, an optical modulation device that modulates light emitted from the light source according to image information, and the optical projection device according to any one of the application examples that projects light modulated by the optical modulation device.

According to this configuration, since the projector includes the optical projection device described above, the projector becomes possible to suppress distortion of light modulated by the optical modulation device and project an image with excellent image quality while achieving miniaturization.

DESCRIPTION OF EMBODIMENTS

First Embodiment

Hereinafter, description will be made on a projector making reference to drawings according to the present embodiment.

A projector of the present embodiment is configured to be able to project an image on a projection surface such as a screen in a state of being supported on a support tool installed at a wall surface or the like or a state of being placed on a desktop or the like.

Figure 1:
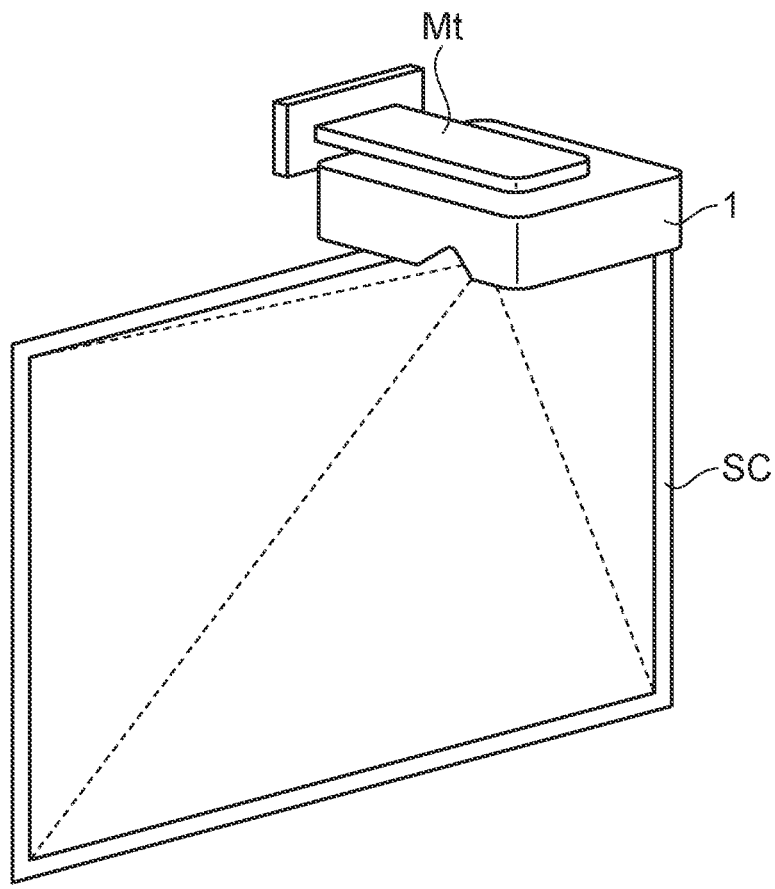
FIG. 1 is a diagram schematically illustrating an example of a usage pattern of a projector of a first embodiment.

FIG. 1 is a diagram schematically illustrating an example of a usage pattern of a projector 1 of a first embodiment. Specifically, FIG. 1 is a diagram schematically illustrating the projector 1 supported on a support tool Mt installed on the wall surface and a screen SC disposed on the wall surface.

The projector 1 is installed above the screen SC and projects an image on the screen SC from a side directed downward, as illustrated in FIG. 1. In the following, for convenience of explanation, a normal direction relative to the wall surface (screen SC) is described as a front-and-back direction, a direction toward the wall surface is described as the front direction (+Y direction), a direction in defiance of gravity is described as the up direction (+Z direction), the right side toward the wall surface is described as the right direction (+X direction) in the projector 1 supported on the support tool Mt. The projector of the present embodiment is configured to be able to project an image even in a posture at which the +Y side or the +Z side is placed on a desktop, a floor, or the like in the posture illustrated in FIG. 1.

[Main Configuration of Projector]

Figure 2:
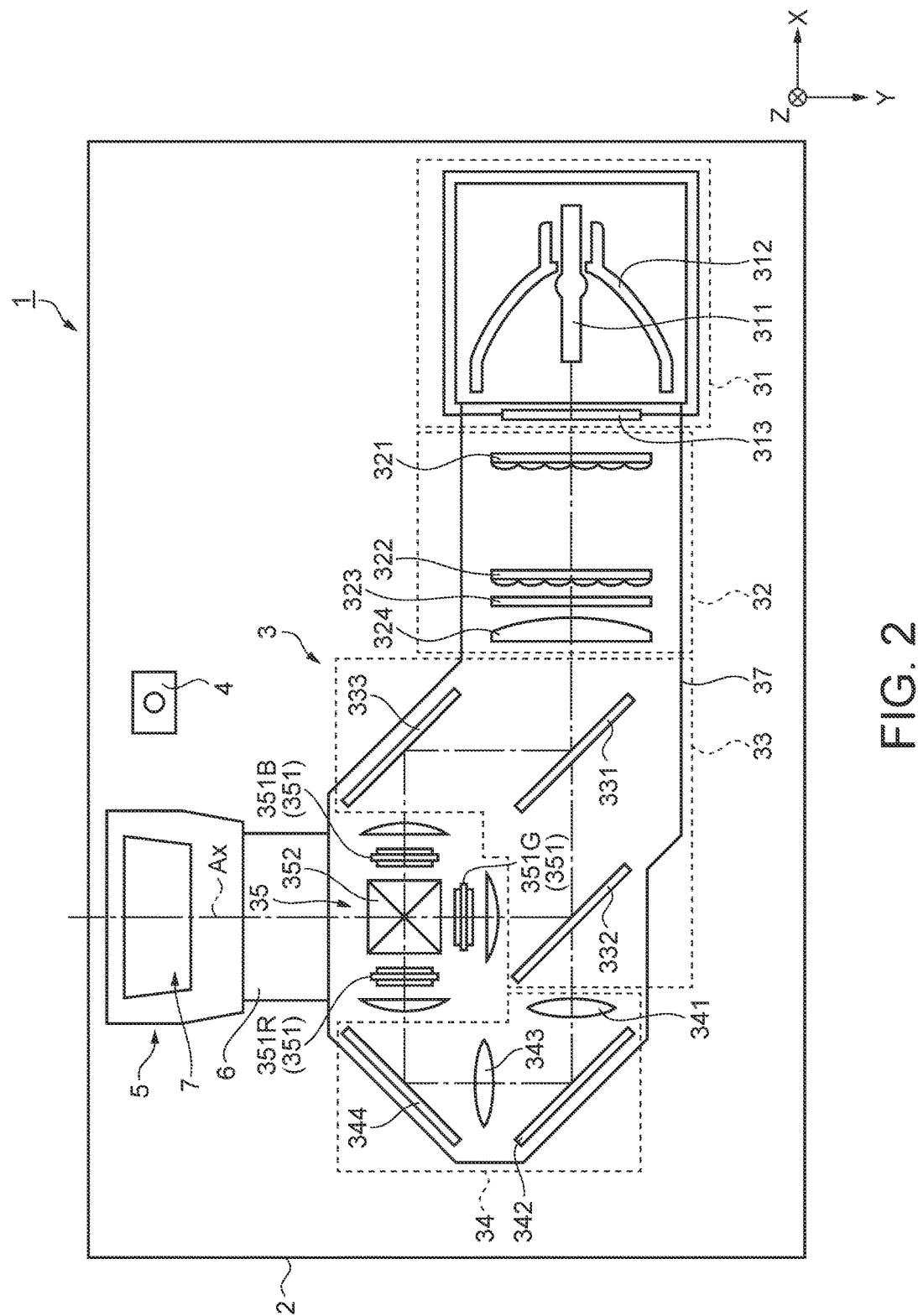
FIG. 2 is a diagram illustrating a schematic configuration of the projector of the first embodiment.

FIG. 2 is a diagram illustrating a schematic configuration of the projector 1 of the first embodiment.

As illustrated in FIG. 2, the projector 1 includes an outer casing 2 constituting an exterior, a controller (not illustrated), an optical unit 3 including a light source device 31, and an image-capturing device 4. Although illustration is omitted, a power supply device supplying power to the light source device 31, the controller, and the like or a cooling device which cools down the optical unit 3 or the like is disposed inside of the outer casing 2.

Although detailed description is omitted, the outer casing 2 is constituted with a plurality of members and is provided with an air inlet for taking outside air or an air outlet for exhausting air warmed inside the outer casing 2 to the outside.

The controller functions as a computer including a central processing unit (CPU), a read only memory (ROM), a random access memory (RAM), or the like and performs control of an operation of the projector 1, for example, control of image projection.

The optical unit 3 projects light emitted from the light source device 31 by optically processing under control of the controller.

As illustrated in FIG. 2, the optical unit 3 includes an integrator illumination optical system 32, a color separation optical system 33, a relay optical system 34, an optical device 35, a optical projection device 5, and a casing for optical components 37 for disposing these optical components at a predetermined position on a optical path, in addition to the light source device 31.

The light source device 31 includes a discharge type light source 311 configured with a super-high pressure mercury lamp, a metal halide lamp, or the like, a reflector 312, a collimating lens 313, and the like. The light source device 31 reflects light emitted from the light source 311 by the reflector 312, arranges an emission direction by the collimating lens 313, and then emits light toward the integrator illumination optical system 32.

The integrator illumination optical system 32 includes a first lens array 321, a second lens array 322, and a polarization conversion element 323, and a superimposed lens 324.

The first lens array 321 has a configuration in which small lenses are arrayed in a matrix shape and divides light emitted from the light source device 31 into a plurality of partial light beams. The second lens array 322 has substantially the same configuration as that of the first lens array 321 and together with the superimposed lens 324, substantially superimposes the partial light beams on a surface of a liquid crystal panel which will be described. The polarization conversion element 323 has a function of arranging random light beams emitted from the second lens array 322 into one type of polarized light beams capable of being used in the liquid crystal panel.

The color separation optical system 33 includes two dichroic mirrors 331 and 332 and a reflection mirror 333 and has a function of separating light emitted from the integrator illumination optical system 32 into color light beams of 3 colors of red light beam (hereinafter, referred to as "R light"), green light beam (hereinafter, referred to as "G light"), and blue light beam (hereinafter, referred to as "B light").

The relay optical system 34 includes a light incidence side lens 341, a relay lens 343, and reflection mirrors 342 and 344 and has a function of guiding R light separated by the color separation optical system 33 to the liquid crystal panel for R light. In the optical unit 3, a configuration in which the relay optical system 34 guides R light is adopted, but is not limited thereto and may adopt, for example, a configuration in which the relay optical system 34 guides B light.

The optical device 35 includes optical modulation devices 351 (it is assumed that an optical modulation device of R light is 351R, an optical modulation device of G light is 351G, an optical modulation device of B light is 351B) provided for respective color light beams and a cross dichroic prism 352 as a color combining optical device.

Each of the optical modulation devices 351 includes a transmissive liquid crystal panel, a light incidence side polarization plate disposed at a light incidence side of the liquid crystal panel, and a light emission side polarization plate disposed at a light emission side of the liquid crystal panel and modulates respective light beams according to image information.

The cross dichroic prism 352 has a substantially square shape to which four right-angle prisms are stuck in plan view and two dielectric multilayer films are formed at an interface at which right-angle prisms are stuck to each other. In the cross dichroic prism 352, the dielectric multilayer films reflect R light and B light modulated in the optical modulation devices 351R and 351B, allows G light modulated in the optical modulation device 351G to transmit, and combines three colors of modulated light beams.

Although details will be described later, the optical projection device 5 includes a first optical system 6 having an optical axis Ax and a second optical system 7 (reflection optical system) reflecting light emitted from the first optical system 6. The optical projection device 5 enlarges and projects light combined in the cross dichroic prism 352 to a screen SC disposed below the projector 1, as illustrated in FIG. 1.

The image-capturing device 4 includes an image-capturing element (not illustrated), for example, a charge coupled device (CCD), a complementary metal oxide semiconductor (CMOS), photographs a projection surface, and outputs photographed information to the controller. The image-capturing device 4 detects light emitted from an indication tool (for example, electronic pen) operated on the projection surface by a user and outputs detected information to the controller. The controller analyzes a position of the indication tool based on information output from the image-capturing device 4 and projects based on the analyzed result as an image in which for example, a locus of the indication tool is represented by points and lines.

[Configuration of Optical Projection Device]

The optical projection device 5 will be described in detail.

Figure 3:
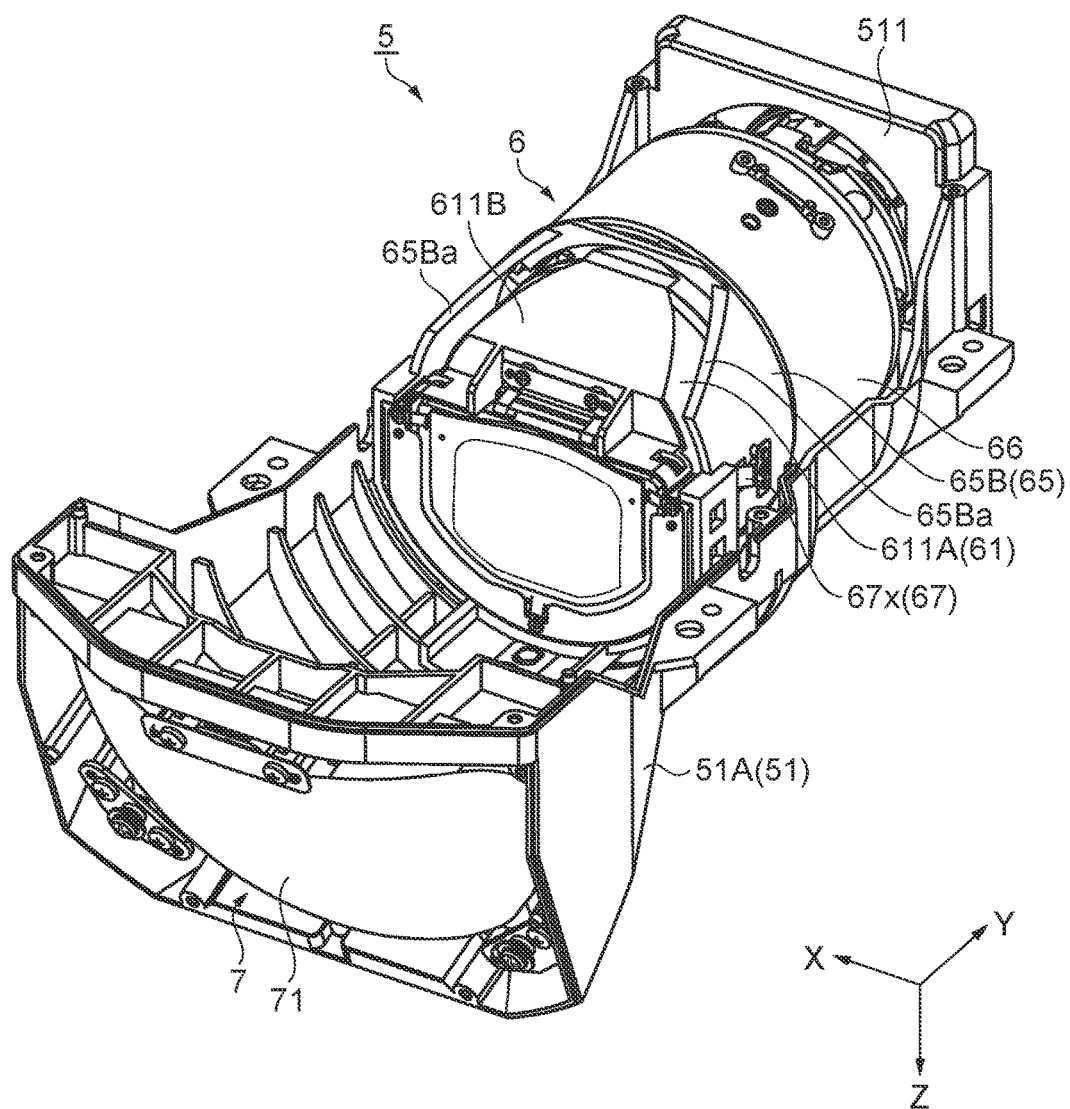
FIG. 3 is a perspective view of a optical projection device of the first embodiment.
Figure 4:
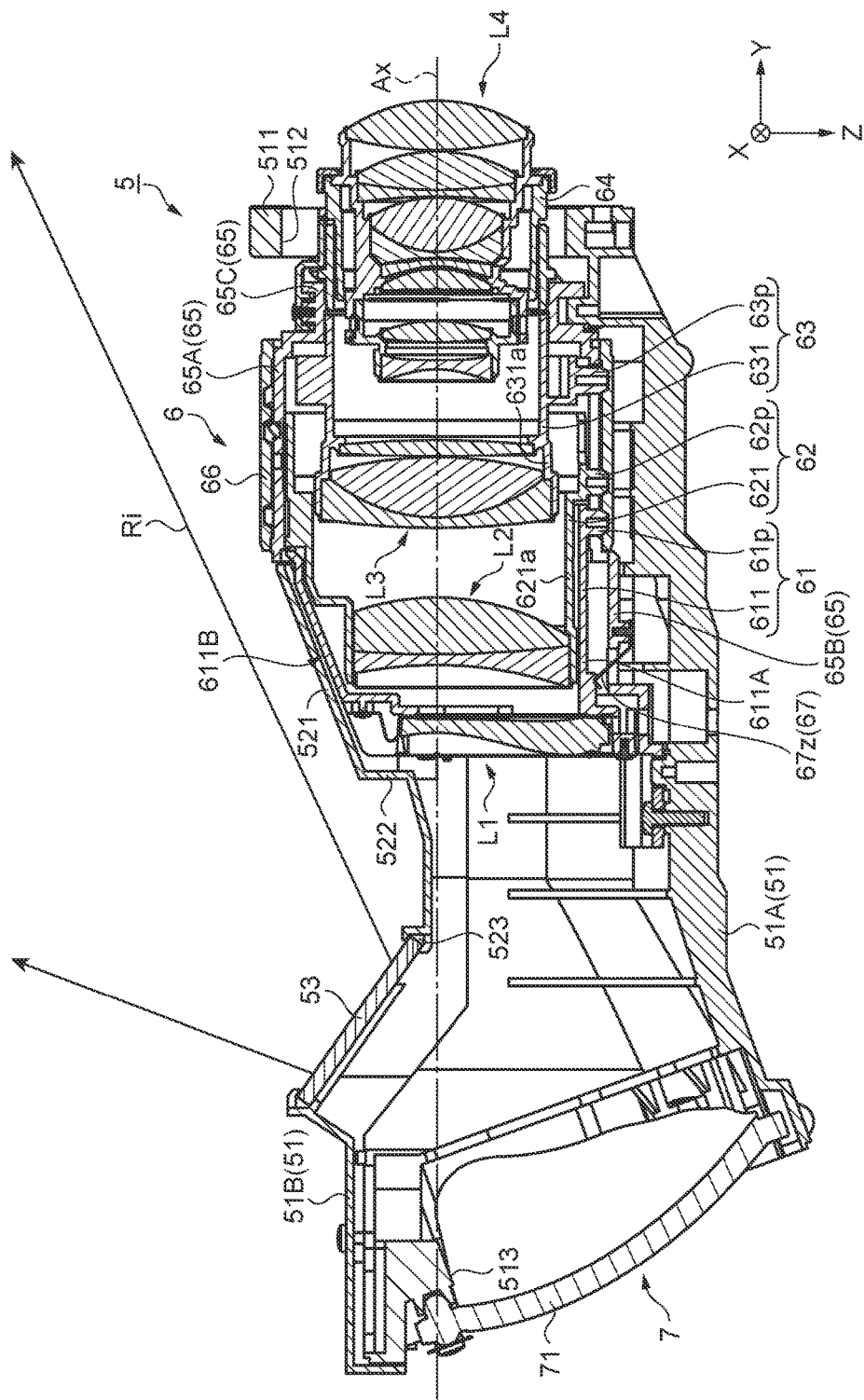
FIG. 4 is a cross-sectional view of the optical projection device of the first embodiment.

FIG. 3 is a perspective view of the optical projection device 5 and illustrates a state in which a cover 51B, which will be described later, is removed. FIG. 4 is a cross-sectional view of the optical projection device 5 in the Y-Z plane including the optical axis Ax.

As illustrated in FIG. 3 and FIG. 4, the optical projection device 5 includes the first optical system 6 having a plurality of lens groups in which a single or a plurality of lenses disposed along the optical axis Ax are set as a single lens group and the second optical system 7 reflecting light emitted from the first optical system 6. As illustrated in FIG. 1, the direction along the optical axis Ax is assumed as ±Y direction in the projector 1 supported on the support tool Mt installed at the wall surface, and a light incidence side (optical path upstream side) onto which light combined in the cross dichroic prism 352 is incident becomes the +Y side and a light emission side (optical path downstream side, second optical system 7 side) becomes the −Y side in the first optical system 6.

The optical projection device 5 includes a casing 51 for optical projection and a light transmitting plate 53, in addition to the first optical system 6 and the second optical system 7 as illustrated in FIG. 4.

Figure 5:
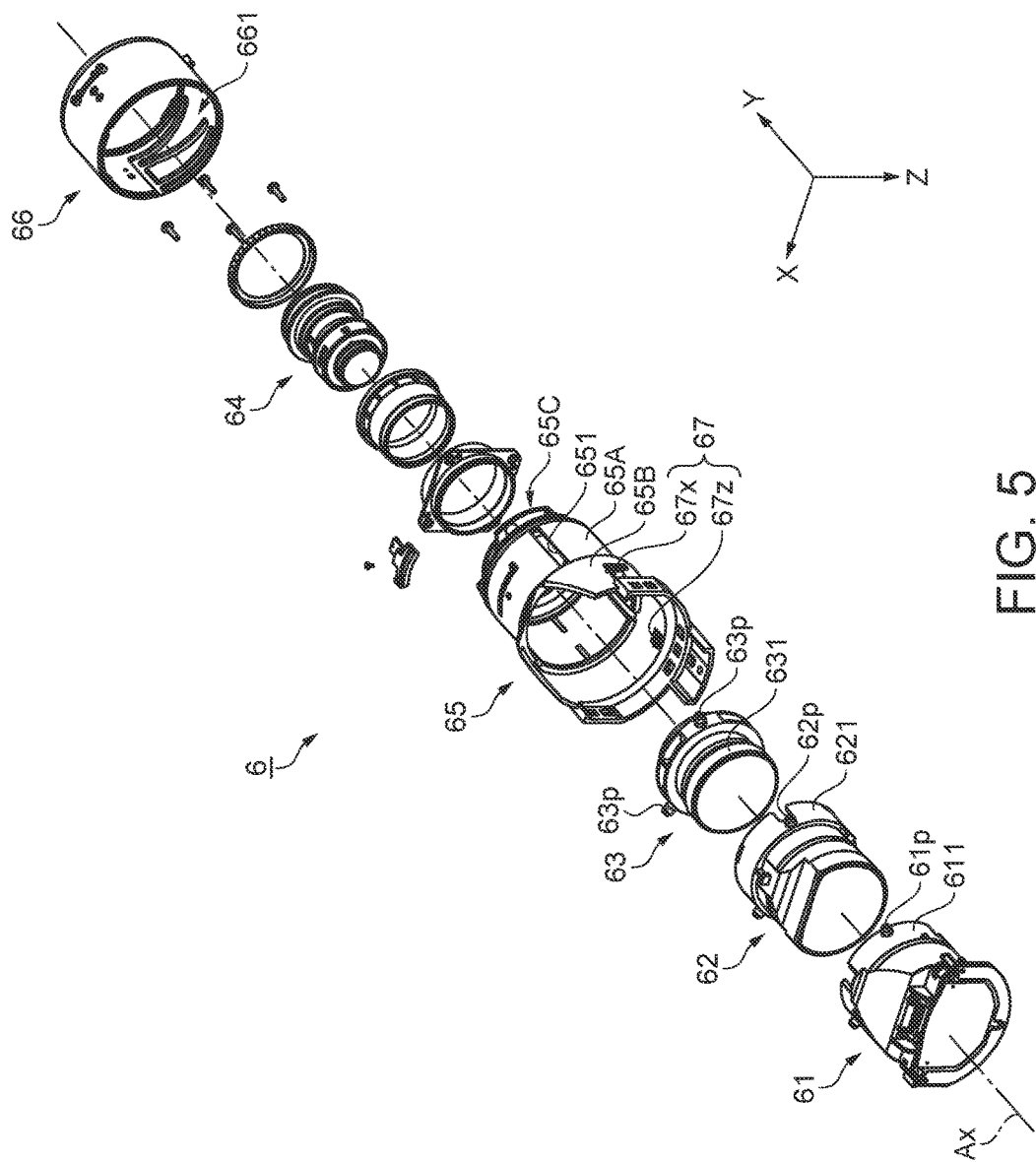
FIG. 5 is an exploded perspective view of a first optical system of the first embodiment.

FIG. 5 is an exploded perspective view of the first optical system 6.

The first optical system 6, as illustrated in FIG. 4 and FIG. 5, includes a first lens group L1 to a fourth lens group L4, a first lens frame 61 to a fourth lens frame 64 which respectively hold a first lens group L1 to a fourth lens group L4, a guide barrel 65, a cam barrel 66, and an urging portion as a first correction portion which are sequentially disposed toward the light incidence side (+Y side) from the light emission side (−Y side) along the optical axis Ax.

The first lens group L1 to the third lens group L3 are movable lens groups movable along the optical axis Ax.

Specifically, the first lens group L1 is constituted with a single lens and is disposed closest to the light emission side (−Y side) among a plurality of movable lens groups in the first optical system 6. A single lens constituting the first lens group L1 is formed with a synthetic resin aspherical lens and has a shape obtained by removing a portion of the −Z side from a circular shape in plan view and a portion of both of the left and right sides. The second lens group L2, the third lens group L3, and the fourth lens group L4 are respectively constituted with a plurality of lenses and are sequentially disposed at the light incidence side (+Y side) of the first lens group L1. The second lens group L2 has a shape obtained by removing a portion of the −Z side from a circular shape in plan view.

The first lens frame 61 to the third lens frame 63 are movable lens frames that respectively hold the first lens group L1 to the third lens group L3.

Specifically, the first lens frame 61 includes a cylindrical holding portion 611 holding the first lens group L1 and a plurality of cam pins 61p protruding from the holding portion 611 in a direction orthogonal to the optical axis Ax.

The second lens frame 62 includes a cylindrical holding portion 621 holding the second lens group L2 and a plurality of cam pins 62p protruding from the holding portion 621 in a direction orthogonal to the optical axis Ax.

The third lens frame 63 includes a cylindrical holding portion 631 holding the third lens group L3 and a plurality of cam pins 63p protruding from the holding portion 631 in a direction orthogonal to the optical axis Ax.

Three cam pins are provided at substantially equal intervals of 120° in the circumferential direction around the optical axis Ax for each of the cam pins 61p, 62p, and 63p, the tip portion is formed in a tapered shape in which the edge portion becomes gradually thinner, and the tip portion is set to a length protruding from a straight movement groove 651, which will be described later, of the guide barrel 65.

The fourth lens frame 64 is formed in a cylindrical shape, holds the fourth lens group L4 and is fixed to the guide barrel 65.

As such, the optical projection device 5 includes the first lens group L1 to the third lens group L3 which are movable and the fourth lens group L4 fixed to the guide barrel 65 that are sequentially disposed toward the light incidence side which becomes the other side of the optical axis from the light emission side which becomes one side of the optical axis Ax. The first lens group L1 corresponds to the top lens group disposed closest to one side of the optical axis Ax among the plurality of the movable lens groups (first lens group L1 to the third lens group L3) and the second lens group L2 and the third lens group L3 correspond to rear-stage lens groups sequentially disposed at the other side (light incidence side) of the top lens group.

The guide barrel 65 is formed with synthetic resin, has an opening in a front-and-back direction (±Y direction), and as illustrated in FIG. 4 and FIG. 5, includes a cylindrical fitting portion 65A fitted into the cam barrel 66, a barrel protruding portion 65B having a cylindrical shape and provided on the −Y side of the fitting portion 65A and a cylindrical mounting portion 65C having a cylindrical shape and provided on the +Y side of the fitting portion 65A.

The barrel protruding portion 65B has an outer diameter larger than an outer diameter of the fitting portion 65A and is formed to protrude from the cam barrel 66 to the −Y side. In the fitting portion 65A, as illustrated in FIG. 5, three straight movement grooves 651 extending in the same direction as the direction along the optical axis Ax are formed from a stepped portion formed with the fitting portion 65A and the barrel protruding portion 65B toward the +Y direction.

The inner diameter of the fitting portion 65A is set to a size capable of allowing the holding portions 631, 621, and 611 to be inserted and the inner diameter of the barrel protruding portion 65B is set to a size capable of allowing the entirety of each of the third lens frame 63, the second lens frame 62, and the first lens frame 61 to be inserted.

The mounting portion 65C has an outer diameter smaller than an outer diameter of the fitting portion 65A and is formed to protrude from the cam barrel 66 to the +Y side.

The third lens frame 63, the second lens frame 62, and the first lens frame 61 are inserted in this order from the barrel protruding portion 65B. Specifically, in the third lens frame 63, the second lens frame 62, and the first lens frame 61, the cam pins 63p, 62p, and 61p are inserted into the straight movement groove 651 and the holding portions 631, 621, and 611 are inserted into the fitting portion 65A. Although detailed description is omitted, the fourth lens frame 64 is fixed to the mounting portion 65C through a member. The guide barrel 65 is not limited to one made of synthetic resin and may include one made of metal such as aluminum.

The cam barrel 66 is made of a synthetic resin and has an opening in the front-and-back direction (±Y direction), the fitting portion 65A of the guide barrel 65 is fitted into the cam barrel 66, and the cam barrel 66 is formed to be rotatable around the optical axis Ax with respect to the guide barrel 65. A cam groove 661 engaged with each of the cam pins 61p, 62p, and 63p protruding from the straight movement groove 651 is formed on the inner surface of the cam barrel 66. The cross-sectional shape of a cam groove 661 is formed to be engaged with the tapered tip portions of the cam pins 61p, 62p, and 63p.

The cam groove 661 includes an introducing portion linearly formed along the optical axis Ax in order to introduce the cam pins 61p, 62p, and 63p and a defining portion which is branched from the introducing portion and defines movement of each of the first lens frame 61, the second lens frame 62, and the third lens frame 63.

The cam barrel 66 is attached to a lever not illustrated and is rotated by allowing the lever to be operated from the outside of the projector 1.

When the cam barrel 66 is rotated, the cam pins 61p, 62p, and 63p are guided to the straight movement groove 651 and the cam groove 661, and the first lens frame 61, the second lens frame 62, and the third lens frame 63 are moved along the straight movement groove 651 independently of each other. Respective movement amounts of the first lens frame 61, the second lens frame 62, and the third lens frame 63 are different from one another and the movement amount of the second lens frame 62 is set to become largest. The cam barrel 66 is rotated to thereby cause focus adjustment by the first optical system 6 to be performed. That is, the first lens group L1 to the third lens group L3 contribute to focus adjustment. This so-called focus adjustment is not limited to focal length adjustment but may include field curvature adjustment. The cam barrel 66 is not limited to one made of synthetic resin and may include one made of metal such as aluminum.

Although details will be described later, the urging portion 67, as illustrated in FIG. 5, includes a first urging portion 67x supported on the guide barrel 65 and a second urging portion 67z, urges a part protruding from the cam barrel 66 of the first lens frame 61 in the direction intersecting with the optical axis Ax, and corrects the inclination of the first lens frame 61 with respect to the optical axis Ax. Specifically, the first urging portion 67x urges the first lens frame 61 in the +X direction and the second urging portion 67z urges the first lens frame 61 in the −Z direction. The +X direction corresponds to the first direction and the −Z direction corresponds to the second direction. That is, the urging portion 67 urges the first lens frame 61 in each of the first direction and the second direction intersecting with each other within a plane orthogonal to the optical axis Ax.

As illustrated in FIG. 4, the second optical system 7 includes a reflection mirror 71 as a reflection portion. The reflection mirror 71 is formed in a concaved surface shape, widens an angle of light emitted from the first optical system 6 to be reflected, and allows light to pass through the vicinity of the first optical system 6. The second optical system 7 may be configured to include a plurality of mirrors or plane mirrors.

As illustrated in FIG. 4, the casing 51 for optical projection includes a casing body 51A and a cover 51B and accommodates the first optical system 6 and the second optical system 7.

As illustrated in FIG. 3 and FIG. 4, the casing body 51A is formed in a box shape opened at its −Z side, and in the casing body 51A, an insertion hole 512 into which the fourth lens frame 64 of the first optical system 6 is inserted is formed on the wall 511 of the +Y side, and an opening 513 closed by the reflection mirror 71 is formed on the wall of the −Y side.

The wall 511 is formed in a rectangular shape in plan view and the optical device 35 is attached to the surface of the +Y side of the wall 511 through a holding member which is not illustrated.

In the first optical system 6, the guide barrel 65 is fixed to the casing body 51A by a screw and is disposed inside the casing body 51A. The reflection mirror 71 is fixed to the casing body 51A by a screw through a member such as a leaf spring.

As illustrated in FIG. 4, in the casing body 51A, the cover 51B closes the −Y side of a part which opens at the −Z side and is formed such that the −Z side of the cam barrel 66 is exposed.

In the cover 51B, an inclination portion 521, a wall 522 extending to the +Z side from the end portion of the inclination portion 521, and an opening 523 through which light reflected from the reflection mirror 71 passes are formed to approach the optical axis Ax as it goes toward the second optical system 7 from the vicinity of an end portion of the −Y side of the cam barrel 66.

The light transmitting plate 53 is formed with plate material such as glass to have a rectangular shape and closes the opening 523 attached to the cover 51B.

Light emitted from the cross dichroic prism 352 refracts in the first optical system 6 and proceeds in the direction inclined to the +Z side rather than the optical axis Ax. Light emitted from the first optical system 6 is reflected by the second optical system 7, proceeds in the direction inclined to the −Z side rather than the optical axis Ax, is transmitted through the light transmitting plate 53, and is projected onto the screen SC.

Here, the movable lens frames (first lens frame 61, second lens frame 62, and third lens frame 63), the guide barrel 65, and the urging portion 67 will be described in further detail.

Figure 6:
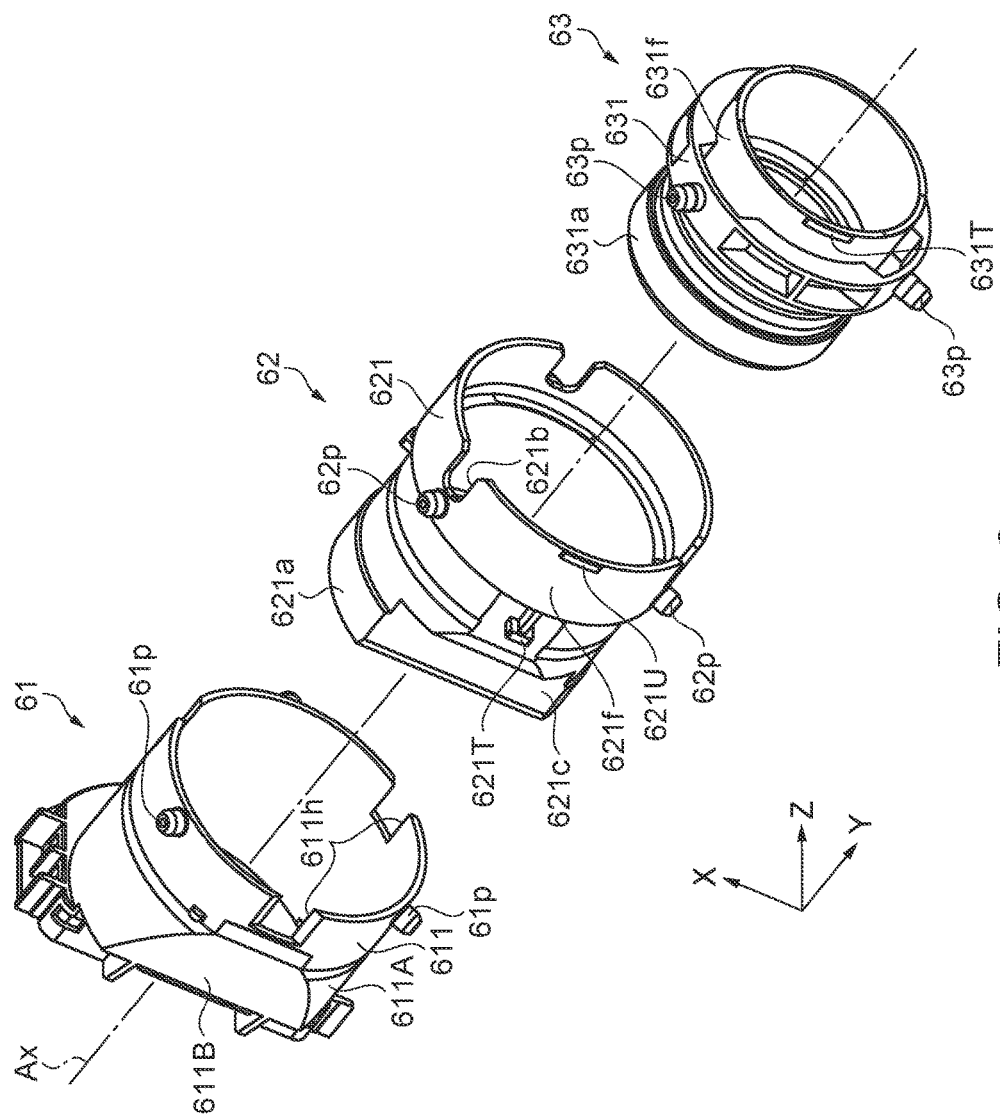
FIG. 6 is a perspective view of a first lens frame, a second lens frame, and a third lens frame of the first embodiment.
Figure 7:
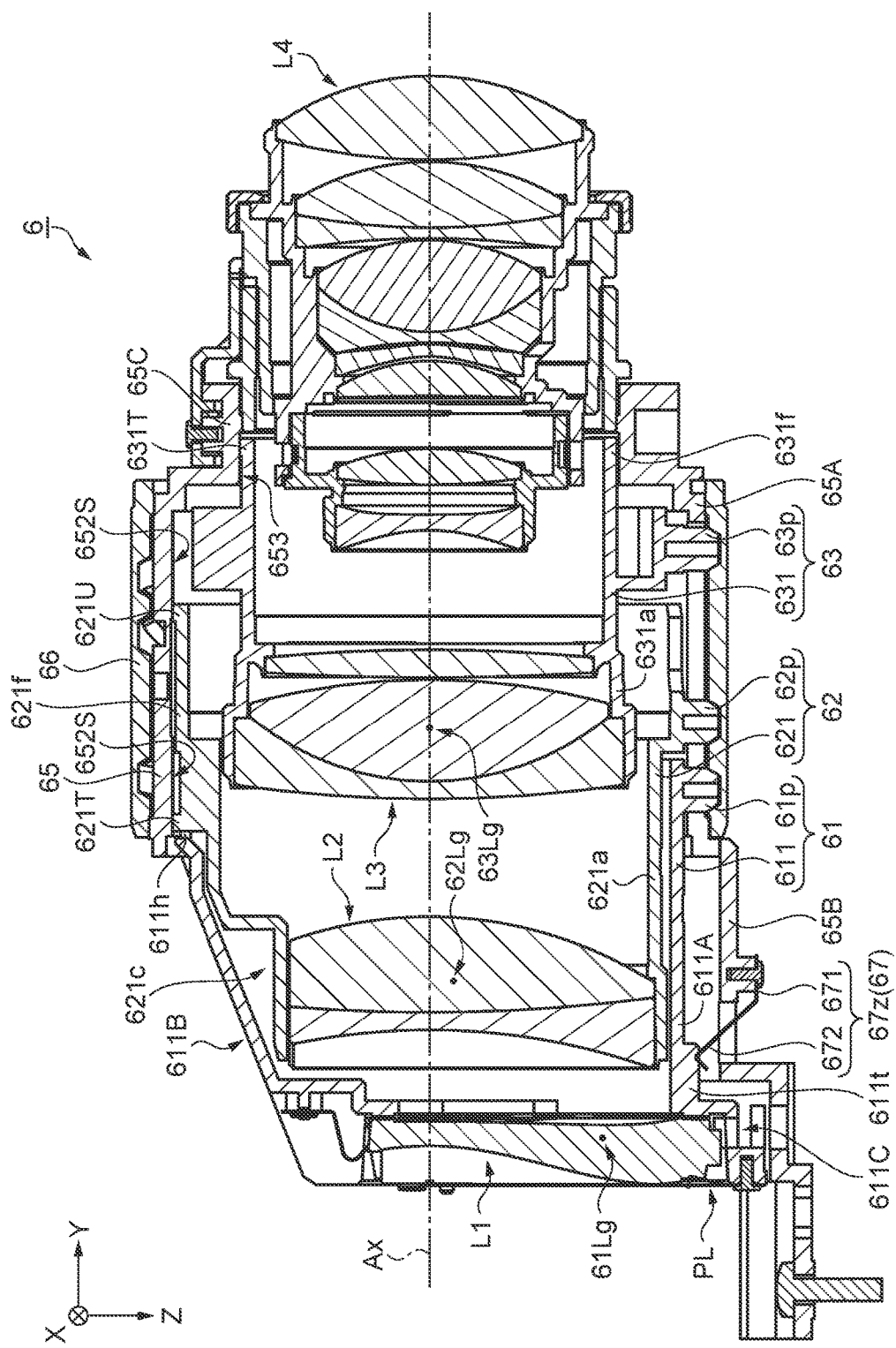
FIG. 7 is a cross-sectional view of a first optical system of the first embodiment.

FIG. 6 is a perspective view illustrating the first lens frame 61, the second lens frame 62, and the third lens frame 63. FIG. 7 is a cross-sectional view of the first optical system 6.

As illustrated in FIG. 6, the first lens frame 61 is formed in such a way that the cam pin 61p is formed in the vicinity of the +Y side end portion of the holding portion 611 and as illustrated in FIG. 3 and FIG. 7, the −Y side of the holding portion 611 protrudes from the cam barrel 66. Apart protruding from the cam barrel 66 of the holding portion 611 is set as a frame protruding portion 611A. The optical projection device 5 of the present embodiment is configured to be able to allow a state in which a protrusion amount from the cam barrel 66 of the holding portion 611, that is, a length of the frame protruding portion 611A in the direction along the optical axis Ax becomes equal to a length of the cam barrel 66 in the direction along the optical axis Ax. The optical projection device 5 may be configured in such a way that the length of the frame protruding portion 611A in the direction along the optical axis Ax becomes clearly shorter than the length of the cam barrel 66 in the direction along the optical axis Ax.

In the frame protruding portion 611A, as illustrated in FIG. 4, an inclination portion 611B formed in such a way that a portion of the end portion of the light emission side is cut out is provided at the −Z side, that is, the side through which light reflected in the reflection mirror 71 passes. The inclination portion 611B is positioned at the inner side of the inclination portion 521 of the cover 51B, and is inclined to approach the optical axis Ax as it goes from the vicinity of the cam barrel 66 to the second optical system 7. The inclination portions 521 and 611B are set to be substantially parallel to a ray of light Ri at a position closest to the first optical system 6 side among light beams reflected in the reflection mirror 71. The shape of the inclination portion 611B is not limited to a planar shape and may include a stepped shape or the like as long as the inclination portion 611B is inclined in its entirety. As illustrated in FIG. 4, the inclination portion 521 of the cover 51B is formed to approach the inclination portion 611B in a range in which the inclination portion 521 is not abutted on the inclination portion 611B in a state where the first lens frame 61 is moved closest to the −Y side.

In the frame protruding portion 611A, as illustrated in FIG. 7, a lens attaching portion 611C in which the first lens group L1 is held is formed at the −Y side of the inclination portion 611B.

Figure 8:
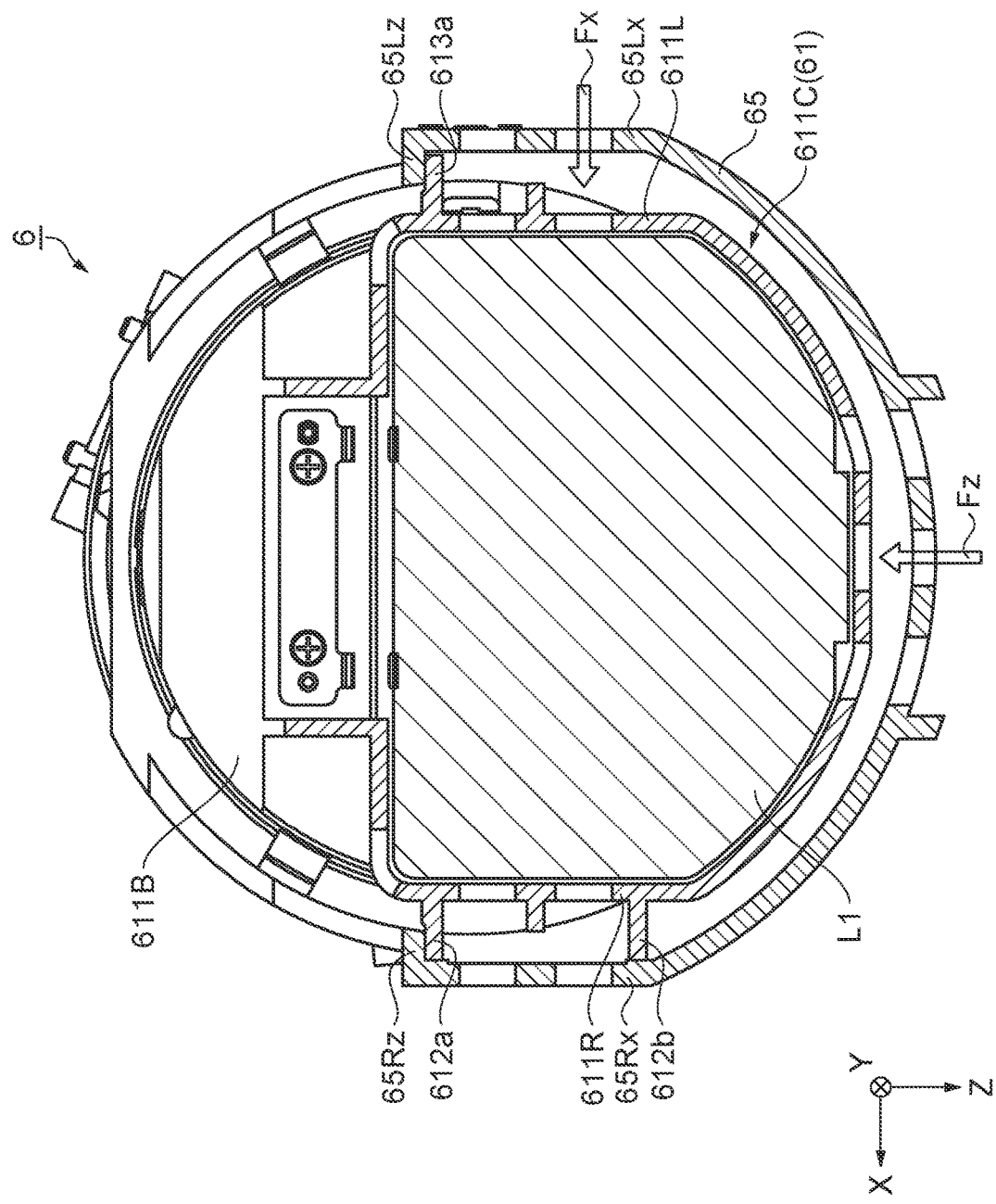
FIG. 8 is a cross-sectional view of the first optical system of the first embodiment when seen from the −Y side.

FIG. 8 is a cross-sectional view of the first optical system 6 when seen from the −Y side and is a cross-sectional view in the lens attaching portion 611C.

The lens attaching portion 611C, as illustrated in FIG. 7 and FIG. 8, is formed such that the +Z side protrudes and is formed to cover the outer peripheral edge of the first lens group L1 and an edge portion of the first lens group L1 in the +Y side. The first lens group L1, as illustrated in FIG. 7, is held in the lens attaching portion 611C by being sandwiched between a ring-shaped metal plate PL having an opening in the center thereof and the lens attaching portion 611C.

In the +Z side of the frame protruding portion 611A, as illustrated in FIG. 7, a protrusion 611t is provided in a corner portion formed by allowing the lens attaching portion 611C to protrude to the +Z side.

As illustrated in FIG. 8, the lens attaching portion 611C is formed in such a way that walls 611L and 611R for holding the first lens group L1 in the left and right direction (±X direction) are formed along the up and down direction (±Z direction). In the wall 611R of the +X side, plate-shaped protrusions 612a and 612b protruding in the +X direction and juxtaposed in the up and down direction are formed. The protrusion 612a is formed at the −Z side of the protrusion 612b. In the wall 611L of the −X side, a protrusion 613a protruding in the −X direction and formed at a position substantially the same as the protrusion 612a in the up and down direction is formed.

In the holding portion 611, as illustrated in FIG. 6, a notch 611h obtained by cutting out an end portion of the +Y side of the holding portion 611 in a rectangular shape in plan view is formed. The notch 611h is formed in such a way that a slide protrusion 621T, which will be described later, provided in the second lens frame 62 is allowed to pass and the slide protrusion 621T abuts on the inner surface of the guide barrel 65. Three notches 611h are provided at substantially equal intervals of 120° so as to be positioned between adjacent cam pins 61p in the circumferential direction of a circle whose center is the optical axis Ax.

As illustrated in FIG. 7, the second lens frame 62 is formed in such a way that the cam pin 62p is formed in the vicinity of the +Y side end portion of the holding portion 621 and the −Y side of the holding portion 621 is able to be inserted into the holding portion 611 of the first lens frame 61. That is, the second lens frame 62 is formed in such a way that the −Y side of the holding portion 621 protrudes from the cam barrel 66, similar to the first lens frame 61. In the second lens frame 62 (holding portion 621), a part inserted into the adjacent first lens frame 61 (holding portion 611) is set as an insertion portion 621a and a part fitted into the fitting portion 65A by insertion is set as a frame fitting portion 621f.

In the insertion portion 621a, as illustrated in FIG. 7, a frame notch 621c positioned at the inner side of the inclination portion 611B of the first lens frame 61 and formed in such a way that a portion thereof is cut out is provided. The frame notch 621c has a shape so that a cross-sectional shape of the insertion portion 621a becomes an L shape. The second lens group L2 is held inside of the frame notch 621c and the second lens frame 62 is disposed such that at least a portion of the second lens group L2 is movable to the inside of the inclination portion 611B in the first lens frame 61.

In the holding portion 621, as illustrated in FIG. 6, a clearance portion 621b into which the cam pin 63p of the third lens frame 63 can be infiltrated by movement of the second lens frame 62 and the third lens frame 63 and which is cut out in a U shape is formed.

On the outer surface of the frame fitting portion 621f, as illustrated in FIG. 6 and FIG. 7, slide protrusions 621T and 621U protruding toward the inner surface of the guide barrel 65 are formed. The slide protrusions 621T and 621U are formed to be abutted on the guide barrel 65 such that the second lens frame 62 is slidable with respect to the guide barrel 65. The slide protrusions 621T and 621U of the present embodiment are intermittently formed at substantially the equal intervals of 120° in the circumferential direction around the optical axis Ax, respectively, and are formed in a long shape which is longer in the circumferential direction than the direction along the optical axis Ax.

As illustrated in FIG. 6, the slide protrusion 621T is provided at the center of the holding portion 621 in the optical axis Ax direction at the +Y side of the frame notch 621c and the slide protrusion 621U is provided at the end portion of the +Y side of the holding portion 621 and is formed at substantially the same position as a position of the slide protrusion 621T in the circumferential direction around the optical axis Ax. As illustrated in FIG. 7, the slide protrusion 621T is formed to be positioned in the −Y direction of the cam pin 62p and the slide protrusion 621U is formed to be positioned in the +Y direction of the cam pin 62p in the direction along the optical axis Ax. That is, the slide protrusions 621T and 621U are formed at both sides of the cam pin 62p by sandwiching the cam pin 62p in the direction along the optical axis Ax.

The slide protrusion 621T, as illustrated in FIG. 7, is formed to be exposed from the notch 611h of the first lens frame 61 due to the positions of the first lens frame 61 and the second lens frame 62.

As illustrated in FIG. 7, the third lens frame 63 is formed in such a way that the cam pin 63p is formed in the vicinity of the +Y side end portion of the holding portion 631 and the −Y side of the holding portion 631 is able to be inserted into the holding portion 621 of the second lens frame 62. In the third lens frame 63 (holding portion 631), a part formed in the adjacent second lens frame 62 (holding portion 621) is set as an insertion portion 631a and a part fitted into the fitting portion 65A is set as a frame fitting portion 631f. The third lens group L3 is held within the insertion portion 631a.

On the outer surface of the frame fitting portion 631f, as illustrated in FIG. 6 and FIG. 7, a slide protrusion 631T protruding toward the inner surface of the guide barrel 65 is formed at the end portion of the +Y side. The slide protrusion 631T is formed to be abutted on the guide barrel 65 such that the third lens frame 63 is slidable with respect to the guide barrel 65. The slide protrusion 631T of the present embodiment is intermittently formed at substantially the equal intervals of 120° in the circumferential direction around the optical axis Ax and is formed in a long shape which is longer in the circumferential direction than the direction along the optical axis Ax.

As such, the second lens frame 62 and the third lens frame 63 among the plurality of the movable lens frames (first lens frame 61, second lens frame 62, and third lens frame 63) include insertion portions 621a and 631a inserted into the lens frame adjacent to one side (light emission side, the −Y side) of the optical axis Ax and the frame fitting portions 621f and 631f fitted into the guide barrel 65, and correspond to the protrusion lens frames.

The cam pin 61p is formed at a position spaced apart from the center of gravity including the first lens frame 61 and members attached to the first lens frame 61 in the direction along the optical axis Ax. Similarly, the cam pin 62p is formed at a position spaced apart from the center of gravity including the second lens frame 62 and members attached to the second lens frame 62 and the cam pin 63p is formed at a position spaced apart from the center of gravity including the third lens frame 63 and members attached to the third lens frame 63, in the direction along the optical axis Ax.

Specifically, as illustrated in FIG. 7, the position of the center of gravity 61Lg including the first lens frame 61 and members (first lens group L1 and metal plate PL) attached to the first lens frame 61 falls within a single lens constituting the first lens group L1 and the cam pin 61p is formed at the position spaced apart from the position of the center of gravity 61Lg in the +Y direction in the direction along the optical axis Ax.

The position of the center of gravity 62Lg including the second lens frame 62 and members (second lens group L2) attached to the second lens frame 62 falls within the second lens group L2 and the cam pin 62p is formed at the position spaced apart from the position of the center of gravity 62Lg in the +Y direction. The position of the center of gravity 63Lg including the third lens frame 63 and members (third lens group L3) attached to the third lens frame 63 falls within the third lens group L3. The cam pin 63p is formed at the position spaced apart from the position of the center of gravity 63Lg in the +Y direction.

As such, the cam pins 61p, 62p, and 63p in the movable lens frames (first lens frame 61 to the third lens frame 63) are respectively formed at positions spaced apart in the same direction (+Y direction) with respect to the respective centers of gravity 61Lg, 62Lg, and 63Lg in the direction along the optical axis Ax.

As described above, the guide barrel 65 includes the fitting portion 65A and the barrel protruding portion 65B, as illustrated in FIG. 3, the barrel protruding portion 65B is able to allow the frame protruding portion 611A to be disposed inside thereof and has a shape obtained by removing a portion so as to expose the inclination portion 611B. An end surface 65Ba formed to be removed is inclined to imitate the inclination portion 611B.

Figure 9:
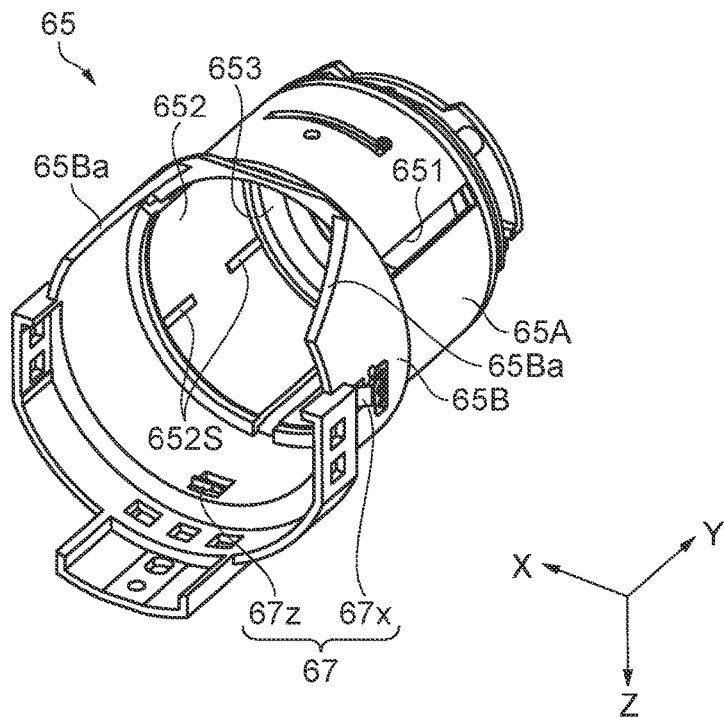
FIG. 9 is a perspective view of a guide barrel and an urging portion of the first embodiment.
Figure 10:
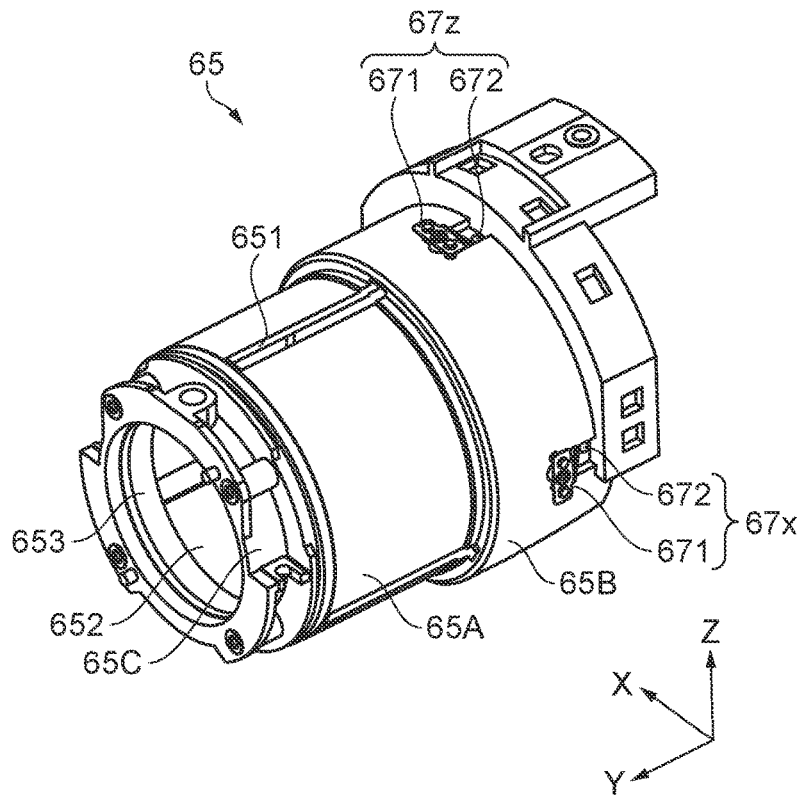
FIG. 10 is another perspective view of the guide barrel and the urging portion of the first embodiment.

FIG. 9 is a perspective view of the guide barrel 65 and the urging portion 67 when seen from the light emission side (−Y side). FIG. 10 is a perspective view of the guide barrel 65 and the urging portion 67 when seen from the light incidence side (+Y side).

In the inner surface 652 of the fitting portion 65A, as illustrated in FIG. 7 and FIG. 9, a slide protrusion 652S protruding toward the holding portion 621 of the second lens frame 62 is formed.

As illustrated in FIG. 7, the slide protrusion 652S is formed to be abutted on the slide protrusions 621T and 621U such that the second lens frame 62 is slidable with respect to the guide barrel 65.

The slide protrusions 652S are intermittently formed at substantially the equal intervals of 120° in the circumferential direction around the optical axis Ax and are formed in two rows to be corresponded to the slide protrusions 621T and 621U along the optical axis Ax, respectively. The slide protrusion 652S is formed in along shape which is longer in the direction along the optical axis Ax than in the circumferential direction. That is, the slide protrusion 652S is abutted on the slide protrusions 621T and 621U formed in the long shape which is longer in the circumferential direction than in the direction along the optical axis Ax with a small contacting area.

As illustrated in FIG. 10, the inner surface 653 of the mounting portion 65C is formed to have an inner diameter which is smaller than the inner diameter of the inner surface 652 of the fitting portion 65A. As illustrated in FIG. 7, the above-described slide protrusion 631T of the third lens frame 63 is formed to be abutted on the inner surface 653 such that the third lens frame 63 is slidable with respect to the guide barrel 65.

The guide barrel 65 has a function of receiving the first lens frame 61 urged by the urging portion 67. As illustrated in FIG. 8, the guide barrel 65 includes a wall 65Rx opposing the wall 611R of the first lens frame 61, a wall 65Lx opposing the wall 611L of the first lens frame 61, and walls 65Rz and 65Lz bent toward the inside from the edge portion of the −Z side of each of the walls 65Rx and 65Lx.

The wall 65Rx is formed to be able to abut on the end surfaces of the protrusions 612a and 612b protruding from the wall 611R and receives the first lens frame 61 urged by the first urging portion 67x in the +X direction (first direction). The walls 65Rz and 65Lz are formed to be able to abut on the protrusions 612a and 613a and receives the first lens frame 61 urged by the second urging portion 67z in the −Z direction (second direction). The walls 65Rx, 65Rz, and 65Lz correspond to the receiving portion.

As described above, the urging portion 67 includes the first urging portion 67x and the second urging portion 67z.

The first urging portion 67x and the second urging portion 67z are configured with leaf springs having elasticity and made of a metal plate material and, as illustrated in FIG. 10, include a fixing portion 671 supported on the guide barrel 65 and a pushing portion 672 pushing the first lens frame 61.

As illustrated in FIG. 7 and FIG. 10, the second urging portion 67z is disposed in such a way that the fixing portion 671 is fixed to the outer surface of the +Z side of the barrel protruding portion 65B by a screw, the pushing portion 672 is inserted from a hole provided at the barrel protruding portion 65B, and the tip portion of the pushing portion 672 infiltrates into the barrel protruding portion 65B.

As illustrated in FIG. 7, the second urging portion 67z urges the frame protruding portion 611A in the −Z direction at a position closer than the cam pin 61p with respect to the center of gravity 61Lg in the direction along the optical axis Ax. Specifically, the second urging portion 67z urges a portion located in the vicinity of the first lens group L1, that is, a portion located in the vicinity of the center of gravity 61Lg, in the direction along the optical axis Ax. More specifically, in the second urging portion 67z, the tip portion of the pushing portion 672 is abutted on the protrusion 611t formed at the +Y side of the lens attaching portion 611C to urge the first lens frame 61.

As illustrated in FIG. 10, the first urging portion 67x is disposed in such a way that the fixing portion 671 is fixed to the outer surface of the −X side of the barrel protruding portion 65B by a screw and the tip portion of the pushing portion 672 infiltrates into the barrel protruding portion 65B from a hole provided at the barrel protruding portion 65B. Similar to the second urging portion 67z, the first urging portion 67x urges the frame protruding portion 611A at a position closer than the cam pin 61p with respect to the center of gravity 61Lg in the direction along the optical axis Ax and urges the vicinity of the center of gravity 61Lg in the +X direction.

The first lens frame 61 urged by the urging portion 67 is slidably abutted on the receiving portion with respect to the guide barrel 65.

Specifically, as illustrated in FIG. 8, the first lens frame 61 is urged with an urging force Fx by the first urging portion 67x and the protrusions 612a and 612b are abutted on the wall 65Rx. The first lens frame 61 is urged with an urging force Fz by the second urging portion 67z, the protrusions 612a is abutted on the wall 65Rz, and the protrusions 613a is abutted on the wall 65Lz.

As such, the urging portion 67 urges the first lens frame 61 positioned closest to the light emission side (−Y side) among the plurality of the movable lens frames (first lens frame 61 to third lens frame 63). The urging portion 67 urges the first lens frame 61, which is positioned closest at an end on a side (−Y direction) opposite to the direction (+Y direction) in which the cam pins 61p, 62p, and 63p are formed to be spaced apart with respect to the centers of gravity 61Lg, 62Lg, and 63Lg, respectively, in the same direction, among the movable first lens frame 61 to the third lens frame 63 in the direction along the optical axis Ax.

When the cam barrel 66 is rotated, the surface of the +X side of the protrusions 612a and 612b of the first lens frame 61 slides on the surface of the −X side of the wall 65Rx and the surface of the −Z side of the protrusions 612a and 613a slides on the surface of the +Z side of the walls 65Rz and 65Lz. As such, the walls 65Rx, 65Rz, and 65Lz as the receiving portion slidably receive the first lens frame 61. The first lens frame 61 slides with respect to the pushing portion 672 of the urging portion 67.

The slide protrusions 621T and 621U are abutted on the slide protrusion 652S of the guide barrel 65 so as to allow the second lens frame 62 to be slid and the slide protrusion 631T is abutted on the inner surface 653 of the guide barrel 65 so as to allow the third lens frame 63 to be slid.

As such, the slide protrusions 621T and 621U, and 652S are abutted such that the second lens frame 62 (protrusion lens frame) is slidable with respect to the guide barrel 65 and the slide protrusion 631T is abutted such that the third lens frame 63 (protrusion lens frame) is slidable with respect to the guide barrel 65. The slide protrusions 621T and 621U, and 652S correspond to a second correction portion correcting the inclination of the second lens frame 62 with respect to the optical axis Ax and the slide protrusion 631T corresponds to a second correction portion correcting the inclination of the third lens frame 63 with respect to the optical axis Ax.

As described above, according to the present embodiment, it is possible to obtain the following effects.

(1) In the first lens frame 61, although the cam pin 61p is formed at a position spaced apart from the center of gravity 61Lg, the inclination with respect to the optical axis Ax due to the urging portion 67 (first correction portion) and the receiving portion is suppressed. Accordingly, it is possible to suppress the inclination of the first lens group L1 while increasing freedom of arrangement of the cam pin 61p or miniaturizing of the cam barrel 66 in the direction along the optical axis Ax. Accordingly, it becomes possible to provide the optical projection device 5 which suppresses distortion of an image and projects an image with excellent image quality while achieving suppression of complication, or miniaturization, light weighting of a structure or configuring member. Since the inclination is suppressed, smooth movement becomes possible in the first lens frame 61, it becomes possible to make an operating force small in a configuration in which the cam barrel 66 is manually rotated, and it becomes possible to realize less power consumption in a configuration in which the cam barrel 66 is electrically rotated.

(2) Since the urging portion 67 urges a portion located in the vicinity of the center of gravity 61Lg in the direction along the optical axis Ax, it becomes possible to efficiently transmit the urging force for suppressing the inclination of the first lens frame 61 to the first lens frame 61. Accordingly, it becomes possible to miniaturize the urging portion 67 and simplify a shape of the urging portion 67. Since it is possible to make the urging force small, it becomes possible for the optical projection device 5 to be easily assembled even in the configuration in which the urging portion 67 is included.

(3) The first lens frame 61 includes the frame protruding portion 611A protruding from the cam barrel 66 to the light emission side and the urging portion 67 urges the frame protruding portion 611A. With this, it is possible to make a size of the cam barrel 66 in the direction along the optical axis Ax small and it becomes possible to suppress the inclination of the first lens frame 61 with respect to the optical axis Ax even in a configuration in which the center of gravity 61Lg resides outside of the cam barrel 66 in the direction along the optical axis Ax.

(4) The cam pins 61p, 62p, and 63p are respectively formed at positions spaced apart in the same direction (+Y direction) with respect to the respective centers of gravity 61Lg, 62Lg, and 63Lg in the direction along the optical axis Ax. The urging portion 67 urges the first lens frame 61, which is positioned closest at an end on a side (−Y direction) opposite to the direction (+Y direction) in which the cam pins 61p, 62p, and 63p are formed to be spaced apart in the same direction, among the movable first lens frame 61, second lens frame 62, and third lens frame 63. With this, it is possible to miniaturize the cam barrel 66 in the direction along the optical axis Ax and it becomes possible to suppress complication of a structure and suppress the inclination of the first lens frame 61, which is disposed closest to the light emission side, with respect to the optical axis even in a configuration in which the plurality of the movable lens groups are included.

(5) Since the optical projection device 5 includes the second optical system 7 having the reflection mirror 71, it becomes possible to change the direction of light from the first optical system 6 and widen the angle of light by the reflection mirror 71. Accordingly, it is possible to provide the optical projection device 5 disposed close to the projection surface and capable of widening the angle.

(6) Since the urging portion 67 includes the first urging portion 67x and the second urging portion 67z, it is possible to suppress the inclination in two directions of the first lens frame 61. With this, it becomes possible to provide the optical projection device 5 projecting an image with excellent image quality.

(7) The walls 65Rx, 65Rz, and 65Lz as the receiving portions are formed in the guide barrel 65 inside of which the first lens frame 61 is disposed and are formed to slidably receive the first lens frame 61. With this, it becomes possible to provide a configuration in which the inclination of the first lens frame 61 is accurately suppressed.

(8) The urging portion 67 is configured with a leaf spring and is supported on the guide barrel 65. With this, it becomes possible to provide a configuration in which the first lens frame 61 is urged in a simple structure while achieving space-saving of disposition space of the urging portion 67 in a simple structure.

(9) The slide protrusions 621T and 621U are abutted on the slide protrusion 652S of the guide barrel 65 so that the second lens frame 62 slides and the slide protrusion 631T is abutted on the inner surface 653 of the guide barrel 65 so that the third lens frame 63 slides. That is, since the inclination of the second lens group L2 and the third lens group L3 with respect to the optical axis Ax is suppressed by the second correction portion (slide protrusions 621T, 621U, 652S, and 631T), it becomes possible to provide the optical projection device 5 projecting an image with excellent image quality.

(10) The slide protrusion 621T is provided in the second lens frame 62 and the slide protrusion 621T passes through the notch 611h formed on the first lens frame 61 and abuts the inner surface of the guide barrel 65. Since the slide protrusion 621T is formed at a position closer than the cam pin 62p with respect to the center of gravity 62Lg in the direction along the optical axis Ax, it becomes possible to efficiently suppress the inclination of the second lens frame 62 with respect to the optical axis Ax.

(11) In the second lens frame 62, both sides of the cam pin 62p are slidably abutted on the guide barrel 65 (slide protrusion 652S) by the slide protrusions 621T and 621U in the direction along the optical axis Ax. In the second lens frame 62, two points become slidably abutted on the guide barrel 65 in the direction along the optical axis Ax. With this, it becomes possible to further suppress the inclination of the second lens frame 62 with respect to the optical axis Ax.

Since the slide protrusion 652S and the slide protrusions 621T and 621U are formed to be abutted to each other with a small contacting area, it becomes possible to move the second lens frame 62 in a light load even in a configuration in which two points are slidably abutted on the guide barrel 65 in the direction along the optical axis Ax.

(12) The slide protrusions 621T and 621U, 631T are intermittently formed in the circumferential direction around the optical axis Ax. With this, simplification of a mold structure for forming the slide protrusions 621T, 621U, and 631T or mold processing for finely adjusting the size of the slide protrusions 621T, 621U, and 631T becomes easier compared to a configuration in which the slide protrusions are formed throughout the entire circumference around the optical axis Ax.

(13) Since the inclination of the movable lens groups (first lens group L1 to the third lens group L3) contributing to the focus adjustment with respect to the optical axis Ax is suppressed, it becomes possible to provide the optical projection device 5 suppressing distortion of an image and projecting an image with excellent image quality, even when the focus adjustment is performed.

(14) Since the projector 1 includes the optical projection device 5, the projector 1 becomes possible to suppress distortion of light modulated by the optical modulation device 351 and project an image with excellent image quality while achieving miniaturization.

Second Embodiment

Hereinafter, a optical projection device according to a second embodiment will be described with reference to the drawings. In the following description, the same reference numerals are given to the same configurations and same members as those of the optical projection device 5 of the first embodiment and description thereof will be omitted or simplified.

Figure 11:
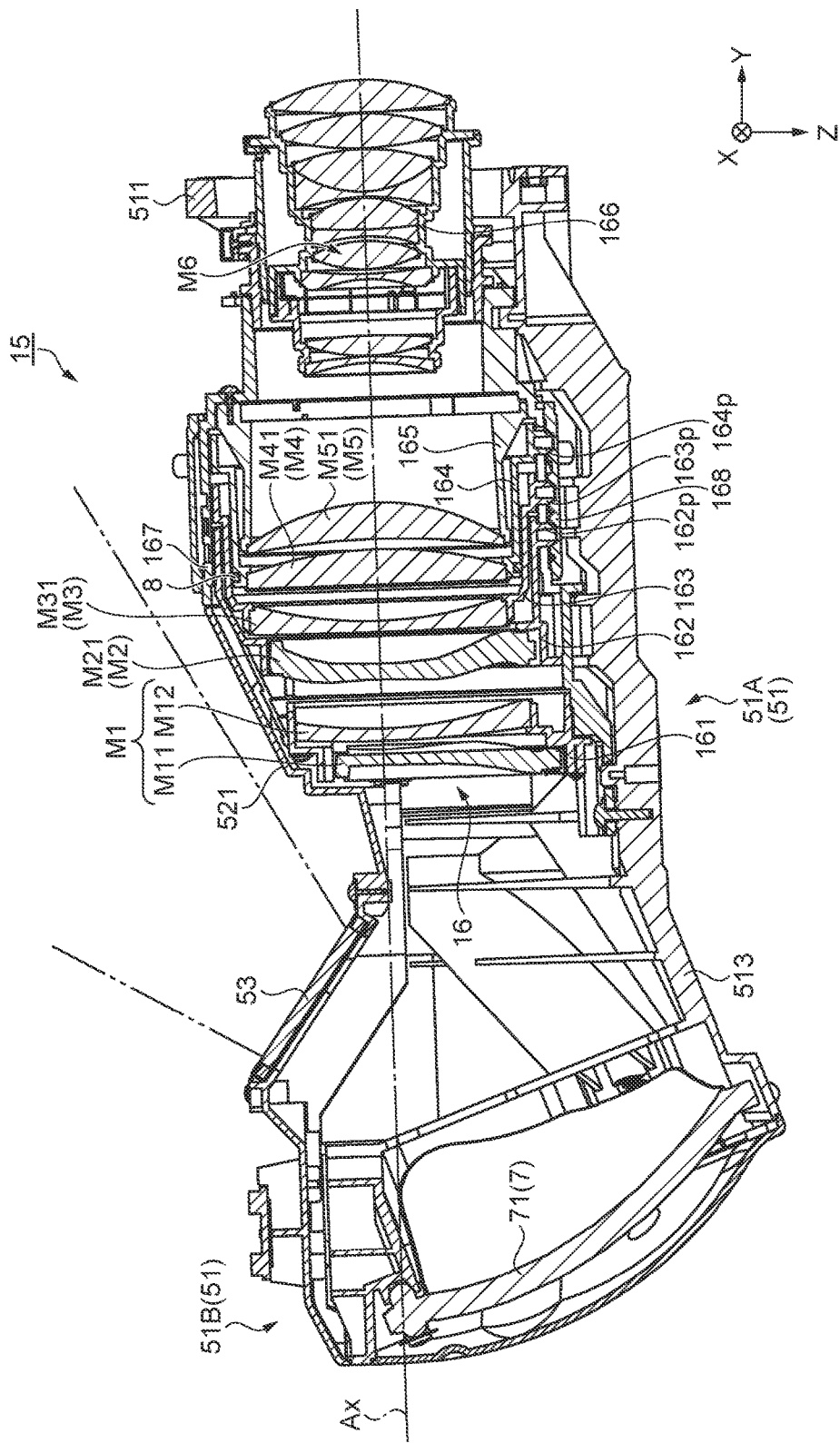
FIG. 11 is a cross-sectional view of a optical projection device of a second embodiment.

FIG. 11 is a cross-sectional view of a optical projection device 15 of the present embodiment.

As illustrated in FIG. 11, the optical projection device 15 includes a first optical system 16 of which the configuration is different from the first optical system 6 of the first embodiment.

The first optical system 16 includes a guide barrel 167, a cam barrel 168, a first lens group M1 to a sixth lens group M6 sequentially disposed from the light emission side (−Y side) along the optical axis Ax, a first lens frame 161 to a sixth lens frame 166 that respectively hold the first lens group M1 to the sixth lens group M6, and a ring-shaped elastic member 8 as a correction portion.

The second lens group M2 to the fourth lens group M4 are movable lens groups capable of being moved along the optical axis Ax. The second lens frame 162 to the fourth lens frame 164 are movable lens frames that respectively hold the second lens group M2 to the fourth lens group M4.

The first lens group M1, the fifth lens group M5, and the sixth lens group M6 are respectively held in the first lens frame 161, the fifth lens frame 165, and the sixth lens frame 166 and fixed to a guide barrel 167.

Figure 12:
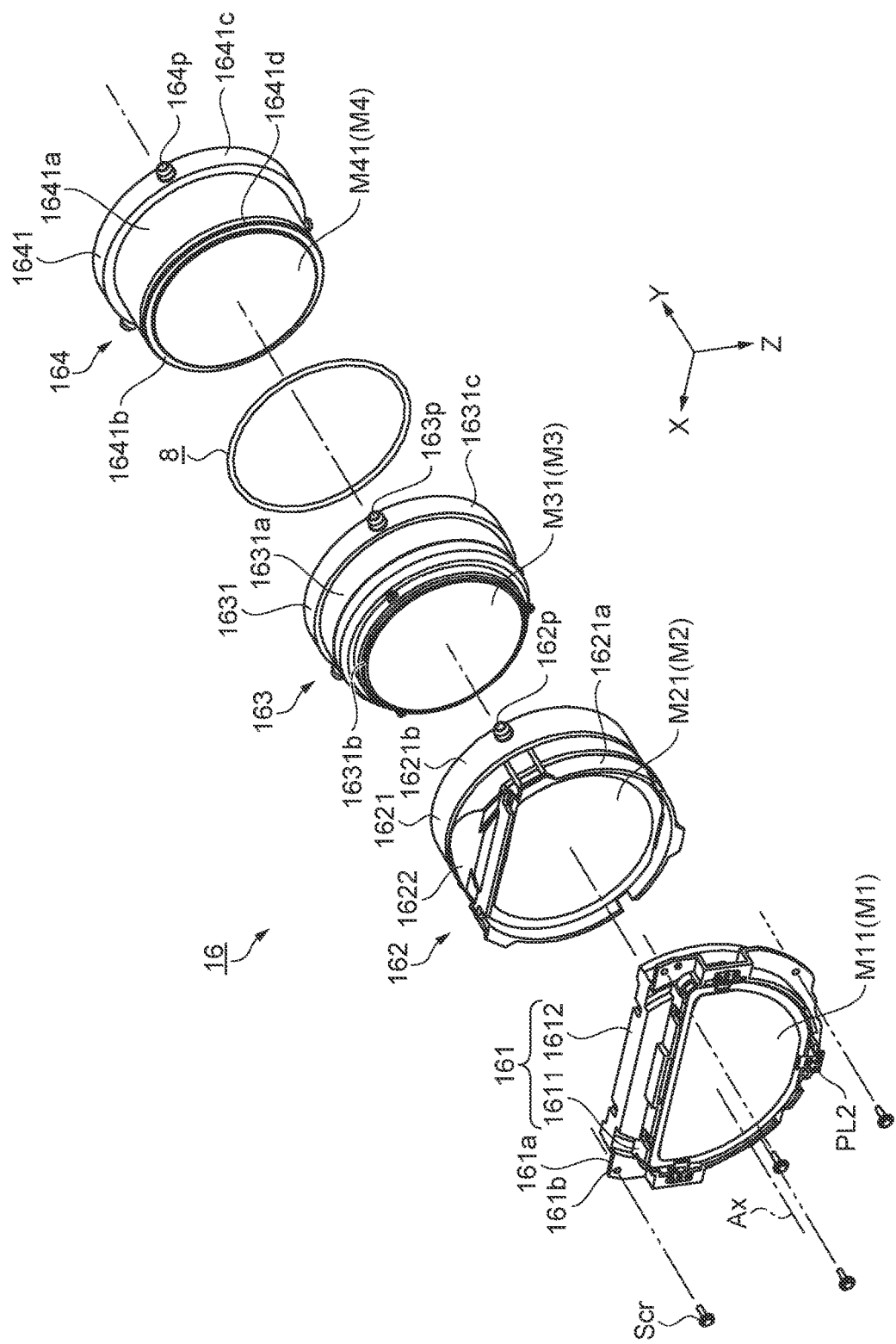
FIG. 12 is an exploded perspective view of a first optical system in the second embodiment.
Figure 13:
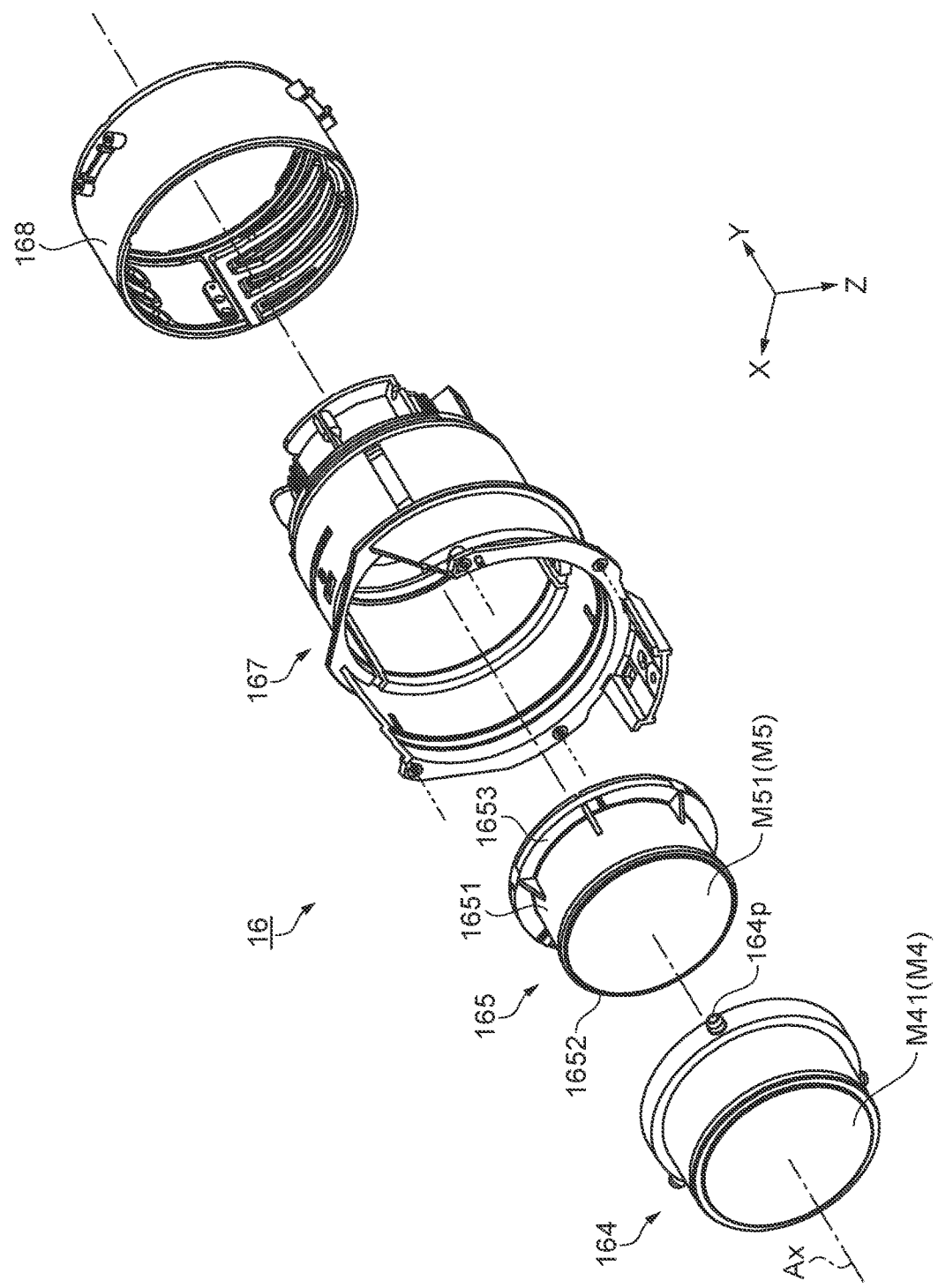
FIG. 13 is another exploded perspective view of the first optical system in the second embodiment.

FIG. 12 and FIG. 13 are exploded perspective views of a first optical system 16. Specifically, FIG. 12 is a diagram illustrating mainly the light emission side (−Y side) in the first optical system 16 and FIG. 13 is a diagram illustrating mainly the light incidence side (+Y side) in the first optical system 16.

As illustrated in FIG. 11 and FIG. 12, the first lens group M1 is configured with a lens M11 which is an aspherical lens and a lens M12 which is a spherical lens and is cut horizontally to the optical axis Ax at a predetermined position in the −Z side of the optical axis Ax.

As illustrated in FIG. 12, the first lens frame 161 includes a holding portion 1611 that holds the lens M11 and a holding portion 1612 that holds the lens M12. The lens M11 is inserted from the front side (−Y side) of the holding portion 1611 and three positions on the outer peripheral portion of the lens M11 are held by a holding piece PL2 and are fixed by a screw. The lens M12 is inserted from the rear side (+Y side) of the holding portion 1612 and the outer peripheral portion is held by heat-caulking.

In the first lens frame 161, a fixing portion 161a extending in the direction intersecting with the optical axis Ax is formed on the outer peripheral surface of the holding portion 1612. A hole portion 161b into which a screw Scr is inserted is formed in the fixing portion 161a. The screw Scr is inserted into the hole portion 161b such that the first lens frame 161 is fixed to the guide barrel 167.

The second lens group M2 is configured with a lens M21 which is an aspherical lens and is cut horizontally to the optical axis Ax at a predetermined position in the upper side of the optical axis Ax.

As illustrated in FIG. 12, the second lens frame 162 includes a holding portion 1621 that holds the lens M21 and a cam pin 162p.

The holding portion 1621 is formed in a generally cylindrical shape. An inclination portion 1622 joined with the inclination portion 521 of the cover 51B (see FIG. 11) is formed on the upper portion of the outer peripheral surface of the front side of the holding portion 1621. An accommodation portion 1621a accommodating the lens M21 from the front side is formed on the front side end portion of the holding portion 1621.

A cam pin 162*p* is formed to be protruded to the outside from the outer peripheral surface of the rear side end portion (cylindrical portion 1621*b*) of the holding portion 1621 in the direction intersecting with the optical axis Ax. Three cam pins 162*p* are formed at equal intervals of 120° in the circumferential direction around the optical axis Ax. The cam pin 162*p* is formed in a tapered shape in which the tip portion becomes gradually thinner in a columnar shape.

The third lens group M3 is configured with a lens M31 which is a spherical lens. The third lens frame 163 includes a holding portion 1631 formed in a cylindrical shape and holding a lens M31 and three cam pins 163*p*. An inserted portion 1631*a* which will be described later and formed in a cylindrical shape is formed at the front side of the holding portion 1631. An accommodation portion 1631*b* accommodating the lens M31 from the front side is formed on the front side end portion of the inserted portion 1631*a*. The lens M31 is held in the accommodation portion 1631*b* by heat-caulking. The cam pin 163*p* is formed in a cylindrical portion 1631*c* having the outer diameter larger than the outer diameter of the inserted portion 1631*a* at the +Y side of the inserted portion 1631*a* similar to the cam pin 162*p*.

The fourth lens group M4 is configured with a lens M41 which is a spherical lens. The fourth lens frame 164 includes a holding portion 1641 formed in a cylindrical shape and holding a lens M41 and three cam pins 164*p*. An insertion portion 1641*a* which will be described later and formed in a cylindrical shape is formed at the front side of the holding portion 1641. An accommodation portion 1641*b* accommodating the lens M41 from the front side is formed on the front side end portion of the insertion portion 1641*a*. A groove portion 1641*d* formed in a concave shape with a predetermined diameter in the peripheral direction is provided in the edge portion of the front side on the outer peripheral surface of the insertion portion 1641*a*. The lens M41 is held in the accommodation portion 1641*b* by heat-caulking. The cam pin 164*p* is provided in the +Y side of the insertion portion 1641*a* and formed in a cylindrical portion 1641*c* having the outer diameter larger than the outer diameter of the insertion portion 1641*a* similar to the cam pin 162*p*.

A ring-shaped elastic member 8 as an elastic member is installed at the groove portion 1641*d*. The ring-shaped elastic member 8 is formed in a ring shape of which the cross-sectional shape is generally circular. The ring-shaped elastic member 8 is configured with a rubber member (for example, silicon based rubber material) and is formed to have a diameter slightly smaller than a predetermined diameter of the groove portion 1641*d*. The ring-shaped elastic member 8 is installed at the fourth lens frame 164 (insertion portion 1641*a*) in a state where the ring-shaped elastic member 8 is fitted into the groove portion 1641*d* to thereby push the groove portion 1641*d* to a central direction. The ring-shaped elastic member 8 is formed in such a way that the ring-shaped elastic member 8 is fitted into the groove portion 1641*d* to thereby protrude slightly from the outer surface of the insertion portion 1641*a*. The ring-shaped elastic member 8 is in a state where being abutted on the inner peripheral surface of the inserted portion 1631*a* in the third lens frame 163 and pushing the third lens frame 163 from the inner surface side.

In the fourth lens frame 164, an insertion portion 1641*a* is inserted into the inserted portion 1631*a* of the third lens frame 163 and the cylindrical portion 1641*c* is fitted into the guide barrel 167. The fourth lens group M4 corresponds to an adjacently-provided lens group adjacent to the third lens group M3 which is the movable lens group and the fourth lens frame 164 that holds the fourth lens group M4 (adjacently-provided lens group) corresponds to an adjacently-provided holding frame.

As illustrated in FIG. 13, the fifth lens group M5 is configured with a lens M51 which is a spherical lens. The fifth lens frame 165 includes a holding portion 1651 formed in a cylindrical shape and holding the lens M51. An accommodation portion 1652 accommodating the lens M51 from the front side is formed on the front side end portion of the holding portion 1651. The lens M51 is held in the accommodation portion 1652 by heat-caulking. On the outer peripheral surface of the rear side end portion of the holding portion 1651, a flange 1653 extending with a predetermined diameter in the direction intersecting with the optical axis Ax is formed. The fifth lens group M5 (fifth lens frame 165) is a fixed lens group in the first optical system 16. In the fifth lens frame 165, the holding portion 1651 is inserted from the +Y side of the guide barrel 167 and the flange 1653 is fixed to the guide barrel 167 by being fastened to the +Y side end portion of the guide barrel 167 by a screw.

As illustrated in FIG. 11, the sixth lens group M6 is configured with a plurality of lenses. The sixth lens frame 166 includes a diaphragm and is configured to be divided into two portions around the diaphragm. One of the divided frames is rotated to perform optical axis adjustment (aligning) after lenses corresponding to the divided frames are installed. Thereafter, the divided frames are integrated by being fixed with an adhesive.

A relationship between the third lens frame 163, the fourth lens frame 164, and the ring-shaped elastic member 8 will be described using FIG. 14 and FIG. 15.

Figure 14:
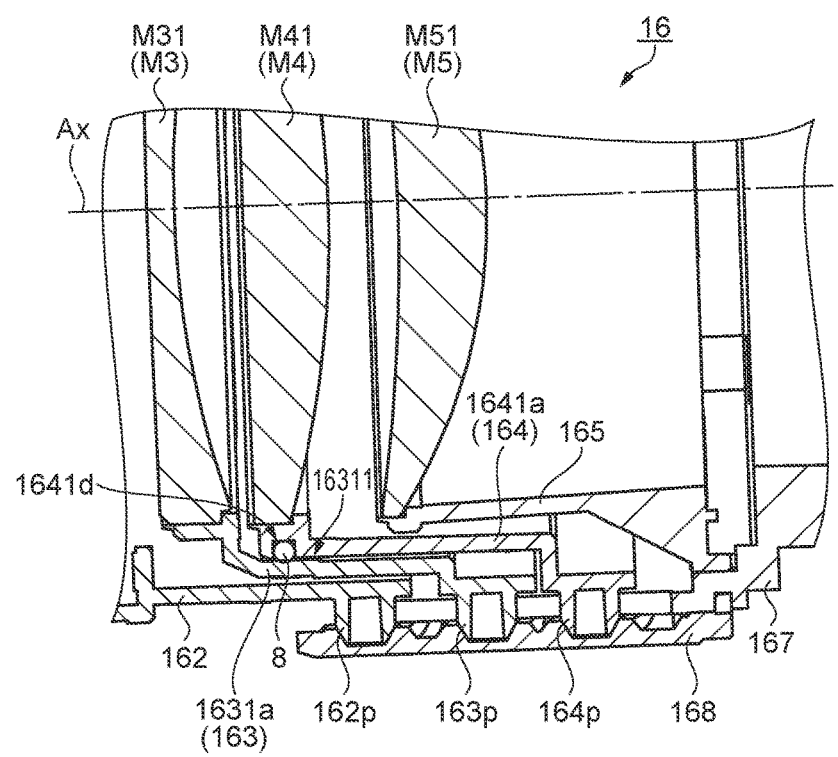
FIG. 14 is a partial cross-sectional view of a portion located in the vicinity of a ring-shaped elastic member in the first optical system of the second embodiment.
Figure 15:
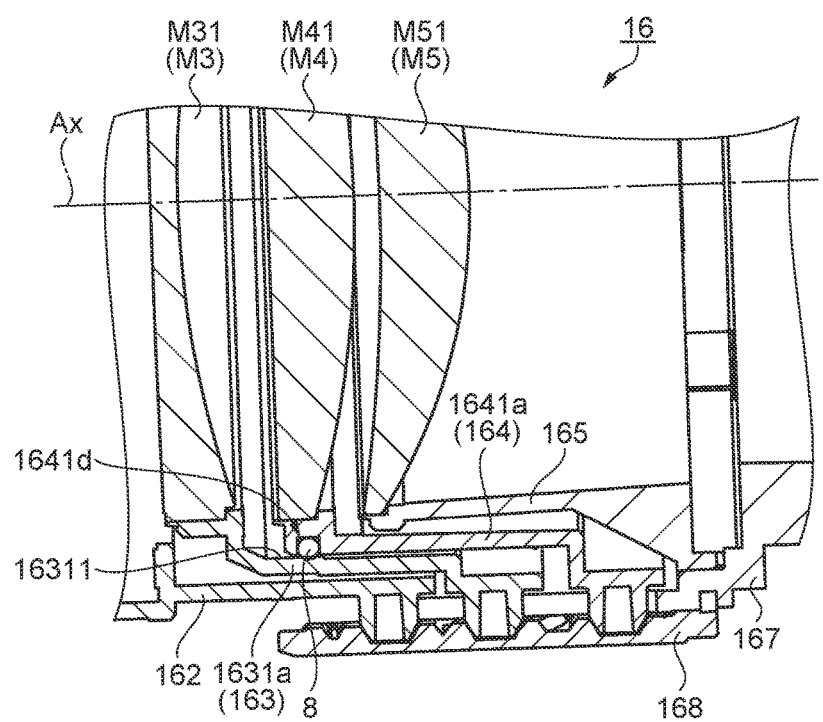
FIG. 15 is another partial cross-sectional view of the portion located in the vicinity of the ring-shaped elastic member in the first optical system of the second embodiment.

FIG. 14 and FIG. 15 are cross-sectional views of a portion in the vicinity of the ring-shaped elastic member 8 in the first optical system 16, FIG. 14 is a diagram illustrating a state in which the third lens group M3 and the fourth lens group M4 are located closest to each other (adjacent state), and FIG. 15 is a diagram illustrating a state in which the third lens group M3 and the fourth lens group M4 are located farthest away from each other (distant state).

As illustrated in FIG. 14 and FIG. 15, an abutting surface portion 16311 protruding to the inside is formed on the inner peripheral surface of the inserted portion 1631*a* of the third lens frame 163.

When the cam barrel 168 is rotated, the third lens frame 163 and the fourth lens frame 164 are moved independently each other and a distance between the third lens frame 163 and the fourth lens frame 164 is changed between the adjacent state (see FIG. 14) and a distant state (see FIG. 15).

The ring-shaped elastic member 8 is abutted on the surface of the abutting surface portion 16311 to push the abutting surface portion 16311 (third lens frame 163) between the adjacent state and the distant state. The abutting surface portion 16311 is subjected to surface machining so as to allow the ring-shaped elastic member 8 to be smoothly slid.

As such, the ring-shaped elastic member 8 is slid on the abutting surface portion 16311 by rotation of the cam barrel 168 and is in a state of always pushing the abutting surface portion 16311 within a movable range of the third lens frame 163 and the fourth lens frame 164. The ring-shaped elastic member 8 always pushes the abutting surface portion 16311 and a state in which a clearance the holding portion 1641 of the fourth lens frame 164 and the holding portion 1631 of the third lens frame 163 is uniformly maintained is caused.

As described above, the following effects can be obtained according to the present embodiment.

(1) According to the optical projection device 15 of the present embodiment, the ring-shaped elastic member 8 as an elastic member is installed in the clearance between the inserted portion 1631a and the insertion portion 1641a inserted into the inserted portion 1631a in the third lens frame 163 and the fourth lens frame 164 that are adjacent to each other. With this, it is possible to secure a predetermined clearance by the ring-shaped elastic member 8 even in a configuration in which installation positions of the cam pin 163p and the third lens group M3 are spaced apart in the third lens frame 163 and a configuration in which installation positions of the cam pin 164p and the fourth lens group M4 are spaced apart in the fourth lens frame 164. Accordingly, it is possible to prevent the mutual inclination between the third lens frame 163 and the fourth lens frame 164 in a case where the third lens frame 163 and the fourth lens frame 164 are moved along the optical axis Ax or a case where the movement is ended. The third lens group M3 and the fourth lens group M4 are prevented from being inclined to thereby make it possible to maintain lens performance and optical performance of the optical projection device 15.

(2) According to the optical projection device 15 of the present embodiment, the ring-shaped elastic member 8 as an elastic member is formed in a ring shape and is installed at the groove portion 1641d having a concave shape installed on the outer peripheral surface of the insertion portion 1641a. As such, it is possible to install the elastic member at the insertion portion 1641a with a simple structure and allow the elastic member to be slid on the inner peripheral surface of the inserted portion 1631a.

Modification Example

The embodiments described above may also be changed as in the following.

Although the optical projection devices 5 and 15 of the embodiments described above include the second optical system 7, a configuration in which the second optical system 7 is not included may be adopted.

Although the optical projection device 5 of the first embodiment includes a first correction portion (urging portion 67) and a second correction portion (slide protrusions 621T, 621U, 652S, and 631T), a configuration in which the optical projection device including any one of the first correction portion and the second correction portion is included may be adopted.

Although the optical projection device 5 of the first embodiment is configured in such a way that the light emission side is one side of the optical axis Ax, the optical projection device may be configured such that the light incidence side becomes the one side. That is, a configuration of the optical projection device in which the lens group disposed closest to the light incidence side among a plurality of lens groups becomes the movable lens group may be adopted and a configuration in which the cam pin of the movable lens frame holding the movable lens group is formed at the position spaced apart from the position of the center of gravity in the light emission direction in the direction along the optical axis Ax and the urging portion urges the movable lens frame at a position closer than the cam pin with respect to the center of gravity may be adopted. A configuration in which the movable lens frame protrudes to the light incidence side with respect to the cam barrel may be adopted and a configuration in which the urging portion urges the protruded part may be adopted.

Although the movable lens groups are three in the configurations of the first optical systems 6 and 16 of the embodiments described above, the number of lens groups is not limited to three and a configuration in which the number of lens groups is one or two, and otherwise, may be four or more may be adopted.

Although the urging portion 67 of the embodiments described above is configured with two urging portions of the first urging portion 67x and the second urging portion 67z, the urging portion 67 may be configured with one or three or more urging portions without being limited to two urging portions.

In a case where the urging portion is configured with one urging portion, a receiving portion is formed to be inclined with respect to the urging direction by the urging portion and to include surfaces opposing each other so as to make it possible to suppress the inclination of the lens frame in the direction intersecting with the urging direction in addition to the urging direction.

In a case where the urging portion is a plurality of urging portion, a part connecting adjacent urging portions may be provided to integrally form a plurality of urging portions.

In the embodiments described above, a configuration in which the urging portion 67 is supported on the guide barrel 65 is adopted, the urging portion may be configured to be supported on the first lens frame 61. In a case of this configuration, the urging portion urges the first lens frame 61 by a reaction force pushing the guide barrel 65 and is moved together with the first lens frame 61.

A configuration in which the movable lens frame disposed in the inner side among the plurality of disposed movable lens frames is urged may be adopted. For example, a configuration in which an opening and a receiving portion are provided in the holding portion 611 of the first lens frame 61 of the first embodiment, one end side protrudes from the opening, and the other end side includes the urging portion supported on the guide barrel 65 may be adopted and a configuration in which the urging portion urges the second lens frame 62 to be received by the receiving portion may be adopted.

Although the urging portion 67 of the first embodiment is configured with a leaf spring, a configuration in which a coil spring, a cushion member, or the like may be adopted without being limited to the leaf spring.

In the first embodiment, a configuration in which the slide protrusions (allowing the second lens frame 62 to slidably abut the guide barrel 65) are provided on both of the second lens frame 62 and the guide barrel 65 is exemplified, a configuration in which the slide protrusion is formed only on the second lens frame 62 or only on the guide barrel 65 may be adopted as long as at least any one of the second lens frame 62 and the guide barrel 65 is formed on the slide protrusion.

Similarly, in the first embodiment, a configuration in which the slide protrusions allowing the third lens frame 63 to slidably abut the guide barrel 65 are provided on the third lens frame 63 is exemplified, a configuration in which the slide protrusion is formed only on the guide barrel 65 or on both of the third lens frame 63 and the guide barrel 65 may be adopted as long as the slide protrusion is formed on at least any one of the third lens frame 63 and the guide barrel 65.

Although the slide protrusions 621T, 621U, and 631T of the first embodiment are formed intermittently in the circumferential direction around the optical axis Ax but may be shaped to be formed throughout the entire circumference around the optical axis Ax.

Although the ring-shaped elastic member 8 is installed on the outer surface of the fourth lens frame 164 (insertion portion 1641a) of the optical projection device 15 in the second embodiment, a configuration in which the ring-shaped elastic member 8 is disposed on the inner surface of the third lens frame 163 (inserted portion 1631a) may be adopted.

The optical projection device 15 of the second embodiment is configured in such a way that the ring-shaped elastic member 8 is disposed between the third lens frame 163 and the fourth lens frame 164, but is not limited to the configuration. For example, the ring-shaped elastic member 8 may be configured to be disposed between the second lens frame 162 and the third lens frame 163 and may be configured to be disposed between the fourth lens frame 164 and the fifth lens frame 165 of which the position is fixed.

In the optical projection device 15 of the second embodiment, the ring-shaped elastic member 8 as an elastic member is formed in a ring shape and the cross-sectional shape of which is a circular shape. However, the cross-sectional shape is not limited to the circular shape. For example, the cross-sectional shape may be a semi-circular shape.

In the optical projection device 15 of the second embodiment, the ring-shaped elastic member 8 (elastic member) is formed in a ring shape and is installed on the outer peripheral surface around the optical axis Ax. However, formation of the elastic member is not limited to the ring shape. For example, as the elastic member, a plurality of elastic members, each of which has a shape of which the cross section in the direction orthogonal to the optical axis Ax is a semicircular shape and which extends in the optical axis Ax direction, may be installed on the outer peripheral surface around the optical axis Ax to be arranged at predetermined pitches. A plurality of elastic members, each of which has a spherical shape in plan view, may be installed on the outer peripheral surface around the optical axis Ax to be arranged at predetermined pitches and a region of the spherical shape may be slid on a corresponding frame portion.

In the optical projection device 15 of the second embodiment, the ring-shaped elastic member 8 is installed by being fitted into the groove portion 1641d having a concave shape of the fourth lens frame 164 (insertion portion 1641a). However, the ring-shaped elastic member 8 may be installed by being adhered to the outer peripheral surface of the insertion portion 1641a.

In the optical projection device 15 of the second embodiment, the ring-shaped elastic member 8 (elastic member) may be coated with a lubricating material such as a fluorine material so as to perform smoothly sliding.

In the optical projection device 15 of the second embodiment, synthetic resin member with high self-lubricity, for example, POM (polyacetal), or the like, in addition to the rubber member as the materials constituting the ring-shaped elastic member 8 (elastic member) may be used. A metal spring member may be used as the elastic member.

In the optical projection devices 5 and 15 of the embodiments described above, although the movable lens group is the lens group contributing to the focus adjustment, a configuration in which a movable lens group contributing to zoom adjustment is included may be adopted and a configuration in which the inclination of the movable lens frame holding the movable lens group with respect to the optical axis Ax is corrected by the correction portion may be adopted.

In the optical projection devices 5 and 15 of the embodiments described above, although a configuration in which the cam barrels 66 and 168 are rotated manually is adopted, a configuration in which the cam barrels 66 and 168 are rotated electrically using a motor or the like may be adopted.

Although a transmissive liquid crystal panel is utilized as an optical modulation device in the projector 1 of the embodiments described above, a projector utilizing a reflective liquid crystal panel may be adopted. A projector which utilizes a micromirror type optical modulation device, for example, a digital micromirror device (DMD), as the optical modulation device may be adopted.

The optical modulation device of the embodiments described above adopts a so-called three-plate system using three optical modulation devices corresponding to R light, G light, and B light, but is not limited thereto. The optical modulation device of the embodiments described above may adopt a single-plate system, or may also be applied to a projector including two or four or more optical modulation devices.

The light source device 31 is not limited to one which uses a discharge type and may be configured with another type of lamp or a light emission diode, a solid light source such as a laser.

The entire disclosure of Japanese Patent Application No. 2015-13025, filed Jan. 27, 2015 and Japanese Patent Application No. 2015-13026, filed Jan. 27, 2015 and Japanese Patent Application No. 2015-65939, filed Mar. 27, 2015 are expressly incorporated by reference herein.

The invention claimed is:
1. A optical projection device including a movable lens group movable along an optical axis, comprising:
 a movable lens frame including a holding portion which holds the movable lens group and a cam pin which protrudes from the holding portion;
 a guide barrel which includes a straight movement groove extending in the same direction as the direction along the optical axis and in which the cam pin is inserted into the straight movement groove;
 a cam barrel which includes a cam groove into which the guide barrel is fitted and with which the cam pin protruding from the straight movement groove is engaged and which is rotated with respect to the guide barrel to thereby guide the cam pin by the straight movement groove and the cam groove and move the movable lens frame along the optical axis; and
 a correction portion which corrects the inclination of the movable lens frame with respect to the optical axis,
 wherein:
  the cam pin is formed at a position spaced apart from the center of gravity including the movable lens frame and members attached to the movable lens frame in the direction along the optical axis,
  the correction portion is an urging portion which urges the movable lens frame in a direction intersecting with the direction along the optical axis,
  the optical projection device includes a receiving portion which receives the movable lens frame urged by the urging portion,
  the urging portion urges the movable lens frame at a position closer than the cam pin with respect to the center of gravity in the direction along the optical axis,
  the movable lens frame protrudes from the cam barrel to the light emission side and includes a frame protruding portion holding the movable lens group, and
  the urging portion urges the frame protruding portion.

2. The optical projection device according to claim claim 1,
wherein the urging portion urges a portion located in the vicinity of the center of gravity in the direction along the optical axis.

3. The optical projection device according to claim 1, further comprising:
a plurality of the movable lens groups; and
a plurality of the movable lens frames which respectively hold the plurality of the movable lens groups,
wherein each of the cam pins is formed at a position spaced apart in the same direction with respect to the center of gravity of each of the movable lens frame and members attached to the movable lens frame in the direction along the optical axis in the plurality of the movable lens frames, and
the urging portion urges the movable lens frame holding the movable lens group disposed closest to an end of a side opposite to the same direction in the direction along the optical axis, among the plurality of movable lens groups.

4. The optical projection device according to claim 1,
wherein the urging portion includes a first urging portion and a second urging portion that urge the movable lens frame in each direction of a first direction and a second direction that intersect with each other within a plane orthogonal to the optical axis.

5. The optical projection device according to claim 1,
wherein the receiving portion is provided in the guide barrel and slidably receives the movable lens frame urged by the urging portion.

6. The optical projection device according to claim 1,
wherein the urging portion is a leaf spring supported on the guide barrel or the movable lens frame.

7. The optical projection device according to claim 1, further comprising:
a plurality of the movable lens groups sequentially disposed toward the other side from one side of the optical axis; and
a plurality of the movable lens frames respectively holding the plurality of the movable lens groups,
wherein at least one movable lens frame of the plurality of the movable lens frames is a protrusion lens frame including an insertion portion inserted into the movable lens frame adjacent to the one side and a frame fitting portion fitted into the guide barrel, and
the correction portion is a slide protrusion which protrudes from at least any one of the inner surface of the guide barrel and the outer surface of the frame fitting portion and by which the protrusion lens frame is slidably abutted on the guide barrel.

8. The optical projection device according to claim 7,
wherein the plurality of the movable lens groups include a top lens group disposed closest to the one side among the plurality of movable lens groups, and a plurality of rear-stage lens groups sequentially disposed at the other side of the top lens group, and
the plurality of the movable lens frames respectively holding the plurality of the rear-stage lens groups are the protrusion lens frame.

9. The optical projection device according to claim 7, further comprising:
the protrusion lens frame having the slide protrusion, and
wherein a notch allowing the slide protrusion to pass is formed in the movable lens frame into which the insertion portion of the protrusion lens frame having the slide protrusion is inserted.

10. The optical projection device according to claim 7, further comprising:
a protrusion lens frame in which the slide protrusions are arranged at both sides between which the cam pin is sandwiched, in the direction along the optical axis.

11. The optical projection device according to claim 7,
wherein the slide protrusions are formed intermittently in a circumferential direction around the optical axis.

12. The optical projection device according to claim 1, further comprising:
an adjacently-provided lens group adjacent to the movable lens group; and
an adjacently-provided holding frame that holds the adjacently-provided lens group,
wherein one of any of the movable lens frame and the adjacently-provided holding frame includes an insertion portion to be inserted into the other of the movable lens frame and the adjacently-provided holding frame, and the other includes an inserted portion into which the insertion portion is inserted,
the correction portion is an elastic member pushed between the outer peripheral surface of the insertion portion and the inner peripheral surface of the inserted portion, and
the elastic member is disposed at one of any of the outer peripheral surface and the inner peripheral surface and is formed to be relatively slidable with respect to the other of the outer peripheral surface and the inner peripheral surface.

13. The optical projection device according to claim 12,
wherein the movable lens frame and the adjacently-provided holding frame are moved along the optical axis independently of each other.

14. The optical projection device according to claim 12,
wherein a groove portion extending in the peripheral direction is formed on the outer peripheral surface of the insertion portion, and
the elastic member is installed at the groove portion formed in a ring shape.

15. The optical projection device according to claim 1, further comprising:
a reflection optical system reflecting light emitted from the movable lens group.

16. The optical projection device according claim 1,
wherein the movable lens group is a lens group contributing to the focus adjustment.

17. A projector comprising:
a light source;
an optical modulation device that modulates light emitted from the light source according to image information; and
the optical projection device according to claim 1 that projects light modulated by the optical modulation device.

* * * * *